US011596001B2

(12) United States Patent
Zhang et al.

(10) Patent No.: US 11,596,001 B2
(45) Date of Patent: Feb. 28, 2023

(54) METHOD AND APPARATUS FOR PERFORMING MULTIPLE RACH PROCEDURES

(71) Applicant: ZTE CORPORATION, Guangdong (CN)

(72) Inventors: Li Zhang, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 295 days.

(21) Appl. No.: 17/037,097

(22) Filed: Sep. 29, 2020

(65) Prior Publication Data

US 2021/0014903 A1   Jan. 14, 2021

Related U.S. Application Data

(63) Continuation of application No. PCT/CN2018/082020, filed on Apr. 4, 2018.

(51) Int. Cl.
| | |
|---|---|
| *H04W 74/08* | (2009.01) |
| *H04W 74/00* | (2009.01) |
| *H04W 76/30* | (2018.01) |
| *H04W 56/00* | (2009.01) |

(52) U.S. Cl.
CPC ... *H04W 74/0833* (2013.01); *H04W 56/0045* (2013.01); *H04W 74/002* (2013.01); *H04W 76/30* (2018.02)

(58) Field of Classification Search
CPC .......... H04W 74/002; H04W 74/0833; H04W 76/30; H04W 56/0045
See application file for complete search history.

(56) References Cited

U.S. PATENT DOCUMENTS

2012/0281679 A1   11/2012 Fan et al.
2017/0041841 A1   2/2017 Pedersen et al.
(Continued)

FOREIGN PATENT DOCUMENTS

| CN | 107493608 A | 12/2017 |
| WO | WO-2016/046606 A1 | 3/2016 |
| WO | WO-2017/030412 A1 | 2/2017 |

OTHER PUBLICATIONS

First Office Action for CN Appl. No. 201880091268.7, dated Jun. 6, 2022 (with English translation, 30 pages).

(Continued)

*Primary Examiner* — Gary Mui
(74) *Attorney, Agent, or Firm* — Foley & Lardner LLP

(57) ABSTRACT

A method and apparatus for performing a random access (RACH) procedure is disclosed. In one embodiment, a method performed by a wireless communication node, includes: performing a plurality of random access (RACH) procedures with a wireless communication device on a first frequency resource set and a second frequency resource set, wherein the plurality of RACH procedures each comprises: receiving a first message on a first frequency resource from the wireless communication device, wherein the first frequency resource is selected from the first frequency resource set; transmitting a second message on a second frequency resource to the wireless communication device within a pre-determined time window, wherein the second frequency resource is selected from the second frequency resource set; receiving a third message on the first frequency resource from the wireless communication device; and transmitting a fourth message on the second frequency resource to the wireless communication device.

19 Claims, 6 Drawing Sheets

(56) References Cited

U.S. PATENT DOCUMENTS

| | | | | |
|---|---|---|---|---|
| 2019/0124699 A1* | 4/2019 | Yamada | ............ | H04W 74/0841 |
| 2019/0208548 A1* | 7/2019 | Shih | ...................... | H04W 24/10 |
| 2019/0215869 A1* | 7/2019 | Lin | ...................... | H04W 74/02 |
| 2020/0280985 A1* | 9/2020 | Ijaz | ................... | H04W 72/0406 |
| 2020/0374926 A1* | 11/2020 | Shah | ................... | H04B 7/0626 |
| 2021/0105813 A1* | 4/2021 | Lee | .................... | H04W 74/085 |
| 2021/0282181 A1* | 9/2021 | Yi | ...................... | H04W 56/001 |

OTHER PUBLICATIONS

Samsung, "NR 4-step random access procedure" 3GPP TSG RAN WG1 NR Ad Hoc, R1-1700891, Jan. 20, 2017, Spokane, Washington (14 pages).

International Search Report and Written Opinion for PCT Appl. No. PCT/CN2018/082020 dated Jan. 4, 2019 (6 pages).

Extended European Search Report for EP Appl. No EP 18913705.2, dated Feb. 8, 2021 (13 pages).

Mediatek Inc.: "RAR design supporting multiple preamble transmission" 3GPP TSG-RAN WG2 Meeting #99; R2-1708049; Aug. 25, 2017; Berlin, Germany (6 pages).

Nokia et al.: "Summary of Remaining Details on RACH Procedure" 3GPP TSG-RAN WG1 #NR1801; R1-1801274; Jan. 26, 2018; Vancouver, BC, Canada (54 pages).

NTT Docomo, Inc.: "Remaining issues on RACH procedure" 3GPP TSG RAN WG1 Meeting #92; R1-1802465; Mar. 2, 2018; Athens, Greece (6 pages).

* cited by examiner

US 11,596,001 B2

METHOD AND APPARATUS FOR PERFORMING MULTIPLE RACH PROCEDURES

CROSS-REFERENCE TO RELATED APPLICATION

This application claims the benefit of priority under 35 U.S.C. § 120 as a continuation of PCT Patent Application No. PCT/CN2018/082020, filed on Apr. 4, 2018, the disclosure of which is incorporated herein by reference in its entirety.

TECHNICAL FIELD

This disclosure relates generally to wireless communications and, more particularly, to a method and apparatus for performing multiple random access (RACH) procedures in a communication system.

BACKGROUND

Over the past few decades, mobile communications have evolved from voice services to high-speed broadband data services. With further development of new types of services and applications, e.g., enhanced mobile broadband (eMBB), massive Machine-Type Communication (mMTC), Ultra Reliability Low Latency Communication (URLLC), etc., the demands for high-performance data transmission on mobile networks will continue to increase exponentially. Based on specific requirements in these emerging services, wireless communication systems should meet a variety of requirements, such as throughput, latency, data rate, capacity, reliability, link density, cost, energy consumption, complexity, and coverage.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

Traditional methods which rely on random access of user terminals and scheduled data transmissions between a base station and a user terminal fail to provide satisfactory performance for the aforementioned services due to limited equipment capacity, high latency, and high signaling overhead. In order to meet these demands in 5G/NR (New Radio) communications, a grant-free data transmission method based on competition is being considered. A random access (RACH) procedure is important during initial access from RRC (radio resource control) idle, when performing a RRC connection establishment procedure, for downlink or uplink data transmission when a wireless communication device is not synchronized, and during handover when uplink synchronization is need in a target cell, etc.

To access an unlicensed spectrum during a RACH procedure, a listen-before-talk (LBT) process is required, in which a CCA (clear channel assessment) is performed. The CCA determines the availability of a channel by detecting a presence of any existing signal on the channel. If signals are detected and the channel is occupied, a next LBT process can be performed after a time period until a non-occupied channel is detected, followed by a data transmission. Such a LBT process is performed during each step of a RACH procedure when accessing an unlicensed spectrum, resulting in increased latency and disadvantageously affecting the system performance. Thus, there exists a need to develop a new method to reduce latency in a RACH procedure when accessing an unlicensed spectrum.

In one embodiment, A method performed by a wireless communication node, includes: performing a plurality of random access (RACH) procedures with a wireless communication device on a first frequency resource set and a second frequency resource set, wherein the plurality of RACH procedures each comprises: receiving a first message on a first frequency resource from the wireless communication device, wherein the first frequency resource is selected from the first frequency resource set; transmitting a second message on a second frequency resource to the wireless communication device within a predetermined time window, wherein the second frequency resource is selected from the second frequency resource set; receiving a third message on the first frequency resource from the wireless communication device; and transmitting a fourth message on the second frequency resource to the wireless communication device; based on a successful receiving of the fourth message of one of the plurality of RACH procedures by the wireless communication device, terminating the rest of the plurality of RACH procedures.

In another embodiment, a method performed by a wireless communication device, includes: performing a plurality of random access (RACH) procedures with a wireless communication node on a first frequency resource set and a second frequency resource set, wherein the plurality of RACH procedures each comprises: transmitting a first message on a first frequency resource to the wireless communication node, wherein the first frequency resource is selected from the first frequency resource set; receiving a second message on a second frequency resource from the wireless communication node within a predetermined time window, wherein the second frequency resource is selected from the plurality of second frequency resources; transmitting a third message on the first frequency resource to the wireless communication node; and receiving a fourth message on the second frequency resource from the wireless communication node; based on a successful receiving of the fourth message of one of the plurality of RACH procedures from the wireless communication node, terminating the rest of the plurality of RACH procedures.

Yet, in another embodiment, a method performed by a wireless communication node, includes: performing a plurality of random access (RACH) procedures with a wireless communication device on a first frequency resource set and a second frequency resource set, wherein the plurality of RACH procedures each comprises: receiving a first message on a first frequency resource from the wireless communication device, wherein the first frequency resource is selected from the first frequency resource set; transmitting a second message on a second frequency resource to the wireless communication device within a predetermined time window, wherein the second frequency resource is selected from the second frequency resource set; based on a successful receiving of the second message of one of the plurality of RACH procedures by the wireless communication device, terminating the rest of the plurality of RACH procedures.

Yet, in another embodiment, a method performed by a wireless communication device, includes: performing a plurality of random access (RACH) procedures with a wireless communication node on a first frequency resource set and a second frequency resource set, wherein the plurality of RACH procedures each comprises: transmitting a first message on a first frequency resource to the wireless communication node, wherein the first frequency resource is selected from the first frequency resource set; receiving a second message on a second frequency resource from the wireless communication node within a predetermined time window, wherein the second frequency resource is selected from the plurality of second frequency resources; based on a successful receiving of the second message of one of the plurality of RACH procedures from the wireless communication node, terminating the rest of the plurality of RACH procedures.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
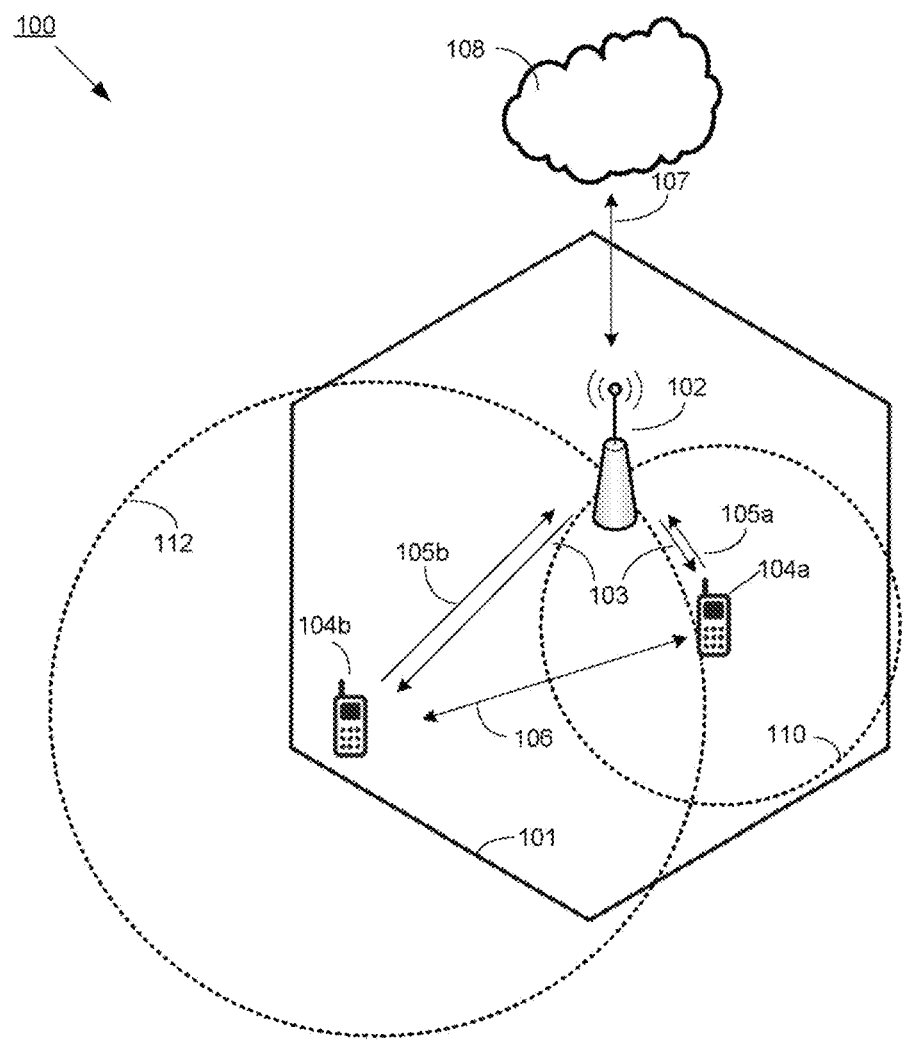
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UE's and BSs, while remaining within the scope of the present disclosure.

Referring to FIG. 1A, the wireless communication network 100 includes a BS 102 and a UE 104a, and a UE 104b (collectively referred to as UE's 104 herein). The BS 102 and the UE's 104 are contained within a geographic boundary of cell 101. A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. The UE 104a has a direct communication channel with the BS 102 operating at a first frequency f1 for downlink communication 103 and a second frequency resource f2 for uplink communication 105a. Similarly, the UE 104b also has a direct communication channel with the BS 102 operating at the first frequency resource f1 (e.g., carrier or bandwidth part) for downlink communication 103 and a third frequency resource f3 for uplink communication. In some embodiments, the second frequency resource f2 and the third frequency resource f3 are different from the first frequency resource f1. In some embodiments, the second frequency resource f2 and the third frequency resource f3 are different from each other. Therefore, the second frequency resource f2 and the third frequency resource f3 have different transmission characteristics, such as for example path loss, coverage, maximum transmission power, etc. In some embodiments, the bandwidth of the first frequency resource f1, the second frequency resource f2 and the third frequency resource f3 can be also different. In some embodiments, the second frequency resource f2 and the third frequency resource f3 may have different transmission characteristics on different bandwidth parts, such as for example path loss, coverage, maximum transmission power, etc. Although only 2 UE's 104 are shown in FIG. 1A, it should be noted that any number of UE's 104 can be included in the cell 101 and are within the scope of this invention. In some embodiments, the coverage of uplink communication 105b is larger than that of the uplink communication 105a, as indicated by dotted circles 112 and 110, respectively. The BS 102 is located at the intercept region of the coverage areas 110 and 112 in order for the BS 102 to perform uplink communication with the UE 104a and UE 104b in the cell 101.

When the UE 104b is at the extreme cell edge 101, e.g., with a longer distance between the BS 102 and UE 104b, path loss becomes significant, so the UE 104b will transmit at a maximum power over a long distance at the third frequency resource f3. As a result, the data rate is relatively low between BS 102 and UE 104b in this case. As the UE 104 moves closer to the BS 102 (i.e., UE 104a), the path loss decreases and the signal level at the BS 102 increases, thus the SNR improves. In response, the BS 102 instructs the UE 104 to reduce power on the second frequency resource f2 to minimize interference to other UE's and/or the BS 102.

The direct communication channels 105/103 between the UE's 104 and the BS 102 can be through interfaces such as an Uu interface, which is also known as UMTS (Universal Mobile Telecommunication System (UMTS) air interface. The direct communication channels (sidelink transmission) 106 between the UE's can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE's 104a and 104b obtains its synchronization timing from the BS 102, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization.

Figure 1B:
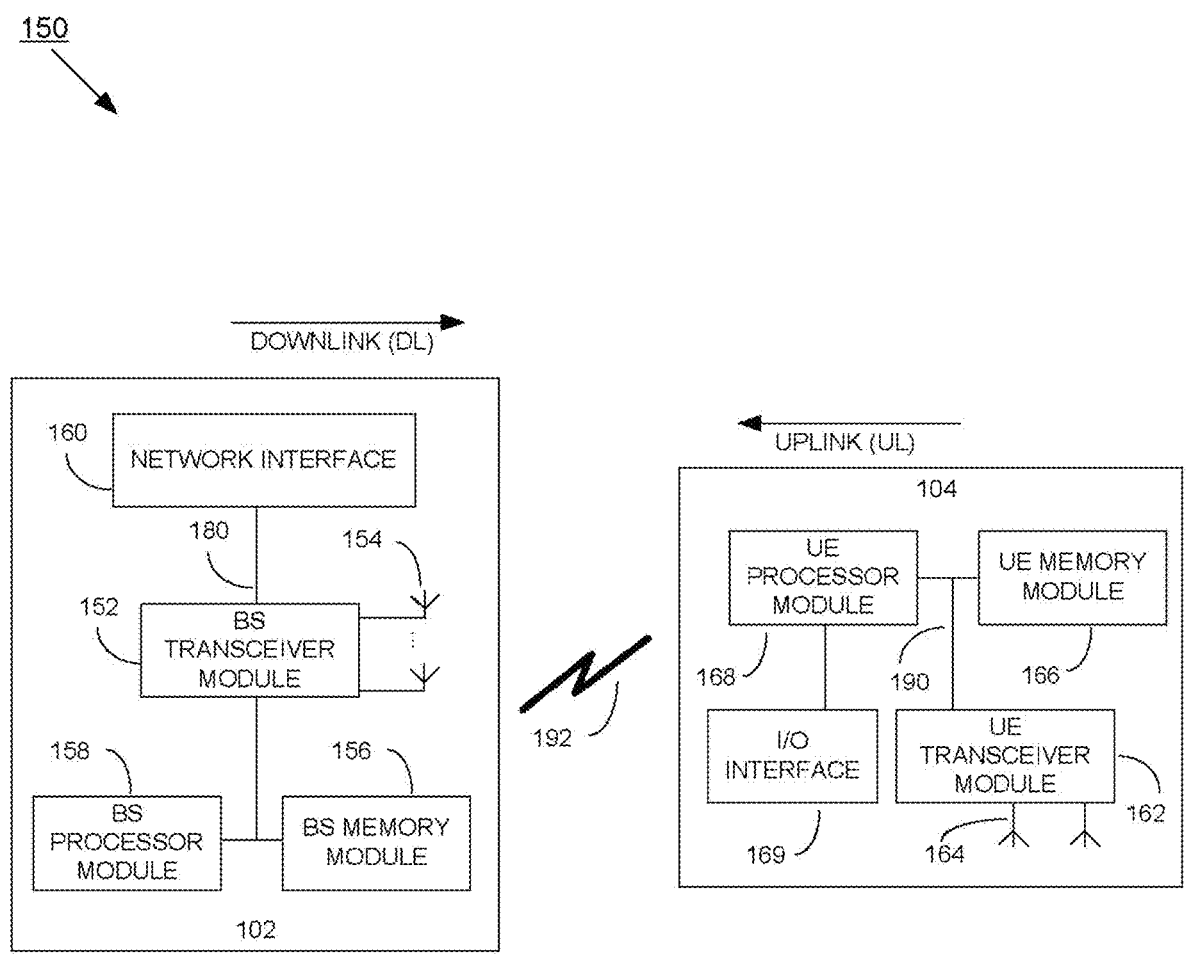
FIG. 1B illustrates a block diagram of an exemplary wireless communication system for a slot structure information indication, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and two UEs 104a and 104b, collectively referred to as UE 104 below for ease of discussion. The BS 102 includes a BS transceiver module 152, a BS antenna array 154, a BS memory module 156, a BS processor module 158, and a Network interface 160, each module being coupled and interconnected with one another as necessary via a data communication bus 180. The UE 104 includes a UE transceiver module 162, a UE antenna 164, a UE memory module 166, a UE processor module 168, and an input/output (I/O) interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to transmit the physical downlink control channel (PDCCH) and configured slot structure related information (SFI) entry set to the UE transceiver 162. In some embodiments, the UE transceiver 162 is configured to receive PDCCH containing at least one SFI field from the BS transceiver 152. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects the PHR triggering message on the UE transceiver module 162, the UE processor module 168 is further configured to determine at least one second SFI entry set based on at least one predefined algorithm and the received at least one first SFI entry set configured by the BS 102, wherein the at least one predefined algorithm is selected based on other parameters calculated or messages received. The UE processor module 168 is further configured to generate the at least one second SFI entry set and monitor the PDCCH received on the UE transceiver module 162 to further receive the at least one SFI field. As used herein, "SFI entry set" means SFI table or SFI entries.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UEs, e.g., between 104a and 104b. As described in further detail below, the UE 104 supports sidelink communications with other UE's as well as downlink/uplink communications between the BS 102 and the UE 104. As discussed above, sidelink communication allows the UEs 104a and 104b to establish a direct communication link with each other, or with other UEs from different cells, without requiring the BS 102 to relay data between UE's.

Figure 2:
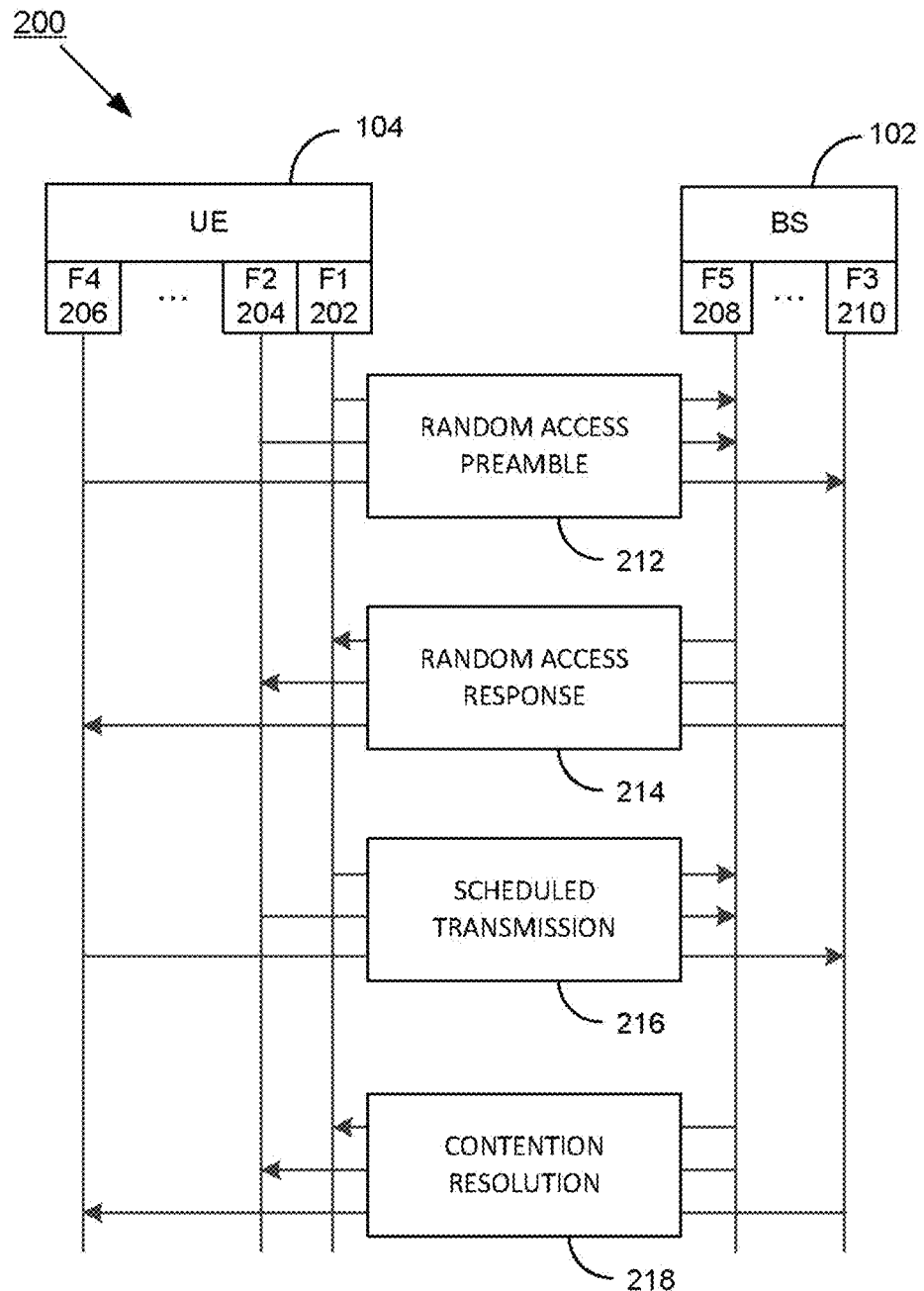
FIG. 2 illustrates a method of performing multiple 4-step contention-based RACH procedures on multiple carriers, according to some embodiments of the present disclosure.

FIG. 2 illustrates a method 200 of performing multiple 4-step contention-based RACH procedures on multiple carriers, according to some embodiments of the present disclosure. It is understood that additional operations may be provided before, during, and after the method 200 of FIG. 2, and that some other operations may be omitted or only briefly described herein. In the illustrated embodiment, there are 3 uplink carriers (i.e., F1 202, F2 204, and F4 206) and 2 downlink carriers (i.e., F3 208 and F5 210), which are configured to the UE 104 through system information or a Radio Resource Control (RRC) message. The uplink carriers F1 202 and F2 204 correspond to the downlink carrier F3 208 and the uplink carrier F4 206 corresponds to the downlink carrier F5 210. Further, RACH configurations, e.g., random access preamble format, transmission timing and PRACH index, corresponding to each uplink carrier are also configured to the UE 104 through the system information or the RRC message. Although only 3 uplink carriers and 2 downlink carriers are shown, any desired number of uplink and downlink carriers may be included in the system while remaining within the scope of the present disclosure.

The method 200 starts with operation 212, in which the UE 104 transmits a random access preamble to the BS 102 on each of the 3 uplink carriers (i.e., F1 202, F2, 204, and F4 206) according to some embodiments. In some embodiments, the UE 104 selects at least one SS (synchronization signal) block for transmitting the random access preamble on the uplink carrier. The at least one SS block is selected from a plurality of SS blocks received on a corresponding downlink carrier by the UE 104 from the BS 102 according to its the SS-RSRP (Synchronization Signal-Reference Signal Received Power) values. If SS-RSRP values are greater than a predefined threshold value, the SS block is selected. The UE 104 further selects at least one PRACH (physical random access channel) occasion (i.e., time-frequency resource) according to a mapping relationship between the PRACH occasions and the SS blocks received in the system information. Then, the UE 104 selects a random access preamble based on the received RACH configuration for each of the corresponding uplink carriers. Before transmitting the random access preamble to the BS 102, the UE 104 performs a LBT process on the selected at least one PRACH occasion on each of the uplink carriers. In some embodiments, the LBT process comprises sensing interference and bursty arrivals of packets through its transmitters to determine interference level and traffic loads on the uplink carrier. If the LBT process fails, the UE 104 restarts the LBT on the corresponding uplink carrier until the LBT process passes (i.e., the uplink carrier is available and unoccupied).

The UE 104 then starts first transmissions of random access preambles to the BS 102 on the PRACH occasion and the corresponding uplink carriers on a PRACH channel, wherein the random access preamble can comprise a cyclic prefix (CP) and a PRACH sequence. In some embodiments, PRACH sequences comprise Zadd-off Chu sequences that are orthogonal to one another. In some embodiments, each uplink carrier use a random access preamble with a different or the same PRACH sequence. In some embodiments, a preamble is selected by the UE 104 for each uplink carriers from a plurality of preamble sequences, which are configured or reserved by the BS 102 to the UE 104 for contention-based or contention-free RACH procedures, respectively. In some embodiments, the aforementioned processes including determining SS blocks, performing a LBT process on a PRACH occasion and transmitting a random access preamble are performed separately and independently on each of the 3 uplink carriers F1 202, F2, 204 and F4 206. Although it is shown that F1 202 starts the transmission of its random access preamble before the transmission on F2 204 and F4 206, the starting time for transmitting random access preambles on the corresponding uplink carriers depends on the PRACH occasion of the corresponding uplink carriers and any delay in their corresponding LBT processes. The relative timing shown in FIG. 2 is an example and is not intended to be limiting. It should be noted that any relative timing in transmitting random access preambles on the uplink carriers are within the scope of the present disclosure.

After a fixed duration of m symbols from the end of the first transmissions of random access preambles, the UE 104 starts a ra-Response Window timer at the start of a PDCCH (physical downlink control channel) occasion on each of the corresponding uplink carriers, wherein m is a non-negative integer. In some embodiments, there is independent re-Response Window timers for each of the 3 uplink carriers F1 202, F2, 204 and F4 206, which can be started and restarted separately and independently.

To ensure reliability of the uplink carrier when the uplink carrier is determined to be unoccupied after the LBT process, in some embodiments, the UE 104 transmits the random access preamble at a preamble power with an Ra-offset value, which determined by:

PREAMBLE_RECEIVED_TARGET_POWER=ra-PreambleInitialReceivedTargetPower+DELTA_PREAMBLE+(PREAMBLE_POWER_RAMPING_COUNTER−1)*powerRampingStep+Ra-offset, wherein the ra-PreambleInitialReceivedTargetPower is an initial preamble power, the DELTA_PREAMBLE is a preamble format based offset, the PREAMBLE_POWER_RAMPING_COUNTER is a counter for preamble transmission which increases by 1 if a preamble is transmitted one time, the powerRampingStep is a power-ramping factor, and the Ra-offset is a non-negative value and configured by system information and may be included in the RACH configuration information. In some embodiments, the Ra-offset value can be 1 decibel (dB), 2 dB, 3 dB and 4 dB and other Ra-offset values can be included and are within the scope of this invention.

The method 200 continues with operation 214 in which the BS 102 generates and transmits random access responses on downlink carriers which correspond to the 3 uplink carriers on which the random access preambles are received, according to some embodiments. In some embodiments, the BS 102 performs LBT processes on the corresponding downlink carriers to determine the availability. The BS 102 further calculates RA-RNTI (Random Access-Radio Network Temporary Identifier) values according to the time and frequency resources on which the random access preambles are transmitted. In some embodiments, there are one RA-RNTI value for each corresponding uplink carrier, which can be determined by:

$$RA\text{-}RNTI=1+s\_id+14*t\_id+14*X*f\_id+14*X*Y*ul\_carrier\_id,$$

wherein s_id is the index of the first OFDM symbol of the PRACH occasion (0≤s_id<14), t_id is the index of the first slot of the PRACH occasion in a system frame (0≤t_id<X), f_id is the index of the first frequency of the PRACH occasion in the frequency domain (0≤f_id<Y), and ul_carrier_id is the index of the uplink carrier used for the random access preamble. Value of X and Y are 80 and 8 respectively. In some embodiments, ul_carrier_id=0 for the first uplink carrier F1 202; ul_carrier_id=1 for the second uplink carrier F2 204; and ul_carrier_id=2 for the third uplink carrier F1 206.

The BS 102 transmits the random access response (RAR) to the UE 104 on the downlink carrier until the LBT process passes (i.e., the downlink carrier is available and unoccupied). In some embodiments, the random access response comprises a PDCCH (Physical Downlink Control Channel), which is scrambled with the corresponding RA-RNTI value. In some embodiments, the random access response is transmitted on the downlink carrier corresponding to the uplink carrier on which the random access preamble is received. Specifically, the BS 102 transmits a first and a second random access responses to the UE 104 on the downlink carrier F3 208 in response to the random access preambles received on the uplink carriers F1 202 and F2 204; and transmits a third random access response on the downlink carrier F5 210 in response to the random access preamble received on the uplink carrier F4 206. In some embodiments, the BS 102 transmits a random access response to the UE 104 on one of the downlink carriers F3 208 or F5 210, despite the uplink carrier on which the random access preamble is obtained.

In some embodiments, because of the opportunity occupation characteristic, a random access response may be delayed and may lead to an expiration of a ra-ResponseWindow timer. When the ra-ResponseWindow timer expires, the UE 104 cannot receive the random access response from the BS 102, which results in a failed RACH procedure on the uplink carrier. In some embodiments, the ra-ResponseWindow timer can be increased to prevent frequent failure of a RACH procedure caused by the time delay in the LBT processes. In some embodiments, a ra-ResponseWindow timer can be selected from a predefined matrix, wherein the matrix comprises [sl 1, sl 2, sl 4, sl 8, sl 10, sl 20, sl 40, sl 80, sl 88]. In some other embodiments, the matrix comprises [sl 1, sl 2, sl 4, sl 8, sl 10, sl 20, sl 40, sl 80, sl 96], wherein each element in the matrix indicates a number of slots that a ra-Response Window timer covers. For example, sl 1 indicates 1 slot for a ra-response Window, which equals to 1 millisecond (ms) and sl 96 indicates 96 slots for a ra-Response Window timer, which equals to 12 ms.

The method 200 continues with operation 216 in which the UE 104 perform scheduled transmissions on the corresponding uplink carriers that are used for transmitting the random access preambles, according to some embodiments. In some embodiments, the schedule transmission is an RRC connection request. In some embodiments, upon receiving the random access response from the BS 102 on a downlink carrier within a corresponding ra-Response Window. The UE 104 can distinguish the random access responses and their corresponding random access preambles according to the RA-RNTI value in the random access responses received from the BS 102. The UE 104 further determines whether each of the random access responses comprises a random access preamble identifier matches the index of the random access preamble (PREAMBLE_INDEX) generated in operation 212. If the random access preamble identifier in the random access response received from the BS 102 on a downlink carrier which matches the PREAMBLE_INDEX, the UE 104 terminates the ra-Response Window timer of the corresponding uplink carrier. If a random access preamble identifier in the random access response received from the BS 102 on a downlink carrier that matches the PREAMBLE_INDEX generated in operation 212 cannot be detected by the UE 104 before the ra-Response Window timer expires, this results in a failed RACH procedure on the uplink carrier. In some embodiments, the UE 104 then determines a number of times that a random access preamble is transmitted on the uplink carrier. If the number of times that the random access preamble is transmitted on the uplink carrier is less than N+1, wherein N is the a predefined maximum number that a random access preamble can be transmitted, the UE 104 continues to operation 502 and restart the RACH procedure on the uplink carrier again on the uplink carrier again.

When the random access preamble identifier in the random access response received from the BS 102 on a downlink carrier matches the PREAMBLE_INDEX and the ra-Response Window timer is terminated, the UE 104 perform a LBT process until an unoccupied uplink carrier is determined. The UE further perform a scheduled transmission on the uplink carrier on which the random access preamble is transmitted. Upon completing the scheduled transmission, the UE 104 starts or restarts a ra-ContentionResolutionTimer corresponding to each of the 3 uplink carriers F1 202, F2 204 and F6 206 at each of the HARQ (hybrid Automatic Repeat Request) retransmission. In some embodiments, the ra-ContentionResolutionTimer for each corresponding uplink carrier can be independently started or restarted.

In some embodiments, slot aggregation can be used to ensure the reliability, in which the schedule transmission is transmitted multiple times on different resources in the time domain. In some embodiments, parameters for slot aggregation including repetition (repK) and repetition redundancy version (repK-RV) can be added in a UL (uplink) Grant transmitted in the random access response from the BS 102. In some embodiments, the repK indicates the number or repetitions and repK-RV indicates the sequence to be used if repetitions are used. In some embodiments, repK and repK-RV comprise 2 bits. In some embodiment, repK comprises 4 positive values, including 1, 2, 4, and 8. In some other embodiments, different values of repK can be included and are within the scope of this invention. In some embodiments, repK and repK-RV can be configured to the UE 104 by system information. The UE 104 transmits the scheduled transmission using repK and repK-RV.

The method 200 continues with operation 218 in which the BS 102 generates contention resolution messages and transmits back to the UE 104 on corresponding downlink carriers, according to some embodiments. In some embodiments, the contention resolution message comprise random access connection setup from the BS 102. In some embodiments, the BS 102 perform a LBT process to determine the availability of the downlink carriers before transmitting the contention resolution messages. If the UE 104 receives the contention resolution message within corresponding ra-ContentionResolutionTimer of the corresponding uplink carrier, the UE 104 stops the ra-ContentionResolutionTimer of the corresponding uplink carrier and meanwhile, the other ongoing RACH procedures on other carriers are then terminated. If the UE 104 does not receives the contention resolution message within the corresponding ra-ContentionResolutionTimer of the corresponding uplink carrier from the BS 102 and if the number of times that the random access preamble is transmitted on the uplink carrier is less than N+1, wherein N is the a predefined maximum number that a random access preamble can be transmitted, the UE 104 continues to operation 502 and restart the RACH procedure on the uplink carrier again.

In some embodiments, when the number of times that the random access preamble is transmitted on the uplink carrier is greater than N+1 (i.e., after multiple failed RACH procedures), a random access problem is reported to an upper layer, e.g., RRC layer. After the upper layer receives it, a radio link failure (RLF) is triggered and an RRC re-establishment procedure will be performed. In order to reduce access delay, the UE 104 may trigger the RACH procedure at least one more time before indicating a random access problem to the upper layer to trigger the RRC re-establishment procedure.

In some embodiments, carriers can be divided into different groups with different priorities. For example, a cell may comprise 6 uplink carriers F1 to F6 which can be configured to a UE 104. The uplink carriers F1, F2 and F3 are in group 1, while group 2 includes the uplink carriers F4, F5 and F6. In some embodiments, group 1 may have a higher priority than group 2. When a RACH is triggered, the UE 104 can initiate a RACH procedure in all the uplink carriers in group 1. When all the RACH procedures on all the carriers of group 1 are failed, i.e. the transmitting times of preamble exceed the maximum number that a random access preamble can be transmitted, the UE 104 can then initiate RACH procedures in all uplink carriers in group 2.

It should be noted FIG. 2 is an example for illustration and discussion purposes. All the RACH procedures (i.e., operations 212-218 on each of the uplink/downlink carrier pairs) are operated independently and any type of relative timings of each operation on each of the uplink or downlink carriers are within the scope of this invention. For example, the transmission of the random access response from the BS 102 to the UE 104 on the downlink carrier F5 208 in operation 214 can occur before the transmission of the random access preamble from the UE 104 to the BS 102 on the uplink carrier F4 206 in operation 212.

Figure 3:
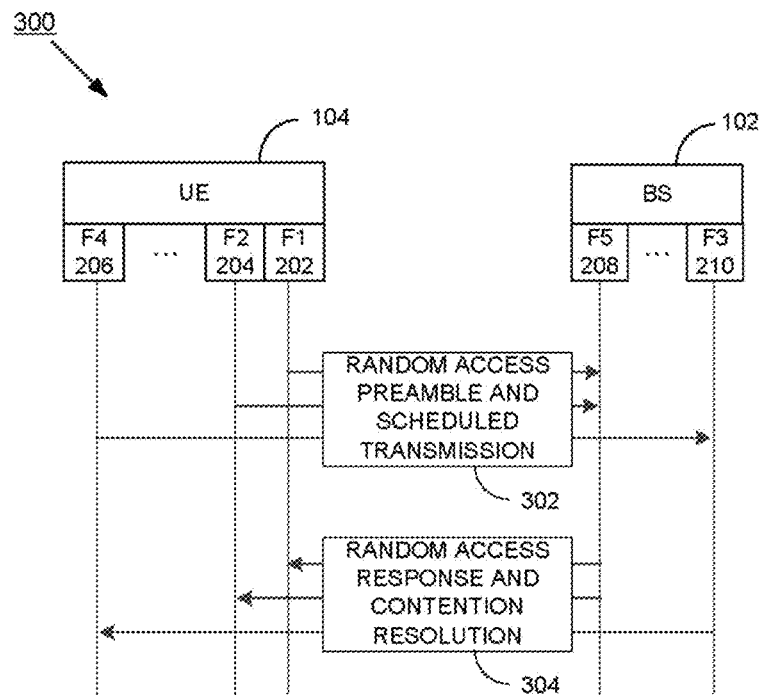
FIG. 3 illustrates a method of performing multiple 2-step contention-based RACH procedures on multiple carriers, according to some embodiments of the present disclosure.

FIG. 3 illustrates a method 300 of performing multiple 2-step contention-based RACH procedures on multiple carriers, according to some embodiments of the present disclosure. It is understood that additional operations may be provided before, during, and after the method 300 of FIG. 3, and that some other operations may be omitted or only briefly described herein. In the illustrated embodiment, there are 3 uplink carriers (i.e., F1 202, F2 204, and F4 206) and 2 downlink carriers (i.e., F3 208 and F5 210), which are configured to the UE 104 through system information or a Radio Resource Control (RRC) message. The uplink carriers F1 202 and F2 204 correspond to the downlink carrier F3 208 and the uplink carrier F4 206 corresponds to the downlink carrier F5 210. RACH configurations, e.g., random access preamble format, transmission timing and PRACH index, corresponding to each uplink carrier are also configured to the UE 104 through the system information or the RRC message. Although only 3 uplink carriers and 2 downlink carriers are shown, any desired number of uplink and downlink carriers may be included in the system while remaining within the scope of the present disclosure.

The method 300 starts with operation 302, in which the UE 104 transmits a random access preamble and scheduled transmission to the BS 102 on each of the 3 uplink carriers (i.e., F1 202, F2, 204, and F4 206) according to some embodiments. In some embodiments, the UE 104 selects at least one SS (synchronization signal) block for transmitting the random access preamble on the first uplink carrier F1 202. The at least one SS block is selected from a plurality of SS blocks received on a corresponding downlink carrier by the UE 104 from the BS 102 according to its the SS-RSRP (Synchronization-signal-Reference Signal Received Power) values. If SS-RSRP values are greater than a predefined threshold value, the SS block is selected. The UE 104 further selects at least one PRACH (physical random access channel) occasion (i.e., time-frequency resource) according to a mapping relationship between the PRACH occasions and the SS blocks received in the system information. Then, the UE 104 selects a random access preamble based on the received RACH configuration for each of the corresponding uplink carriers. Before transmitting the random access preamble to the BS 102, the UE 104 performs a LBT process on the selected at least one PRACH occasion on each of the uplink carriers. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., the uplink carrier is available and unoccupied).

The UE 104 then starts first transmissions of random access preambles to the BS 102 on the PRACH occasion and the corresponding uplink carriers. In some embodiments, the aforementioned processes including determining SS blocks, performing a LBT process on a PRACH occasion and transmitting a random access preamble are performed separately and independently on each of the 3 uplink carriers F1 202, F2, 204 and F4 206. Although it is shown that F1 202 starts the transmission of its random access preamble before the transmission on F2 204 and F4 206, the starting time for transmitting random access preambles on the corresponding uplink carriers depends on the PRACH occasion of the corresponding uplink carriers and any delay in their corresponding LBT processes. The relative timing shown in FIG. 2 is an example and is not intended to be limiting. It should be noted that any relative timing in transmitting random access preambles on the uplink carriers are within the scope of the present disclosure.

After a fixed duration of m symbols from the end of the first transmissions of random access preambles, the UE 104 starts a timer T1 at the start of a PDCCH (physical downlink control channel) occasion on each of the corresponding uplink carriers, wherein m is a non-negative integer. In some embodiments, there are an independent timer for each of the 3 uplink carriers F1 202, F2, 204 and F4 206, which can be started and restarted separately and independently.

To ensure reliability of the uplink carrier when the uplink carrier is determined to be unoccupied after the LBT process, in some embodiments, the UE 104 transmits the random access preamble at a preamble power with an Ra-offset value, which determined by:

PREAMBLE_RECEIVED_TARGET_POWER=ra-PreambleInitialReceivedTargetPower+DELTA_PREAMBLE+(PREAMBLE_POWER_RAMPING_COUNTER−1)*powerRampingStep+Ra-offset, wherein the ra-PreambleInitialReceivedTargetPower is an initial preamble power, the DELTA_PREAMBLE is a preamble format based offset, the PREAMBLE_POWER_RAMPING_COUNTER is the counter of preamble transmission, and it is incremented by 1 if preamble is transmitted one time, the powerRampingStep is the power-ramping factor, and the Ra-offset is a non-negative value and configured by system information and may be included in the RACH configuration information. In some embodiments, the Ra-offset value can be 1 decibel (dB), 2 dB, 3 dB and 4 dB and other Ra-offset values can be included and are within the scope of this invention.

The method 300 continues with operation 304 in which the BS 102 generates and transmits random access responses and contention resolution on downlink carriers which correspond to the 3 uplink carriers on which the random access preambles are received, according to some embodiments. In some embodiments, the BS 102 performs LBT processes on the corresponding downlink carriers to determine the availability. The BS 102 further calculates RN-RNTI (Random Access-Radio Network Temporary Identifier) values according to the time and frequency resources on which the random access preambles are transmitted. In some embodiments, there are one RA-RNTI value for each corresponding uplink carrier, which can be determined by:

$$RA\text{-}RNTI=1+s\_id+14*t\_id+14*X*f\_id+14*X*Y*ul\_carrier\_id,$$

wherein s_id is the index of the first OFDM symbol of the PRACH occasion (0≤s_id<14), t_id is the index of the first slot of the PRACH occasion in a system frame (0≤t_id<X), f_id is the index of the PRACH occasion in the frequency domain (0≤f_id<Y), and ul_carrier_id is the index of the uplink carrier used for the random access preamble transmission. Value of X and Y are 80 and 8 respectively. In some embodiments, ul_carrier_id=0 for the first uplink carrier F1 202; ul_carrier_id=1 for the second uplink carrier F2 204; and ul_carrier_id=2 for the third uplink carrier F1 206.

The BS 102 transmits the random access response to the UE 104 until the LBT process passes (i.e., the downlink carrier is available and unoccupied). In some embodiments, the random access response comprises a PDCCH (Physical Downlink Control Channel), which is scrambled with the corresponding RA-RNTI value. In some embodiments, the random access response is transmitted on the downlink carrier corresponding to the uplink carrier on which the random access preamble is received. Specifically, the BS 102 transmits a first and a second random access responses to the UE 104 on the downlink carrier F3 208 in response to the random access preambles received on the uplink carriers F1 202 and F2 204; and transmits a third random access response on the downlink carrier F5 210 in response to the random access preamble received on the uplink carrier F4 206. In some embodiments, the BS 102 transmits a random access response to the UE 104 on one of the downlink carriers F3 208 or F5 210, despite the uplink carrier on which the random access preamble is obtained.

In some embodiments, upon receiving the random access response and contention resolution from the BS 102 on a downlink carrier within a corresponding timer T1, the UE 104 can distinguish the random access responses and their corresponding random access preambles according to the RA-RNTI value in the random access responses received from the BS 102. The UE 104 further determines whether each of the random access responses comprises a random access preamble identifier matches the index of the random access preamble (PREAMBLE_INDEX) generated in operation 212. If the random access preamble identifier in the random access response received from the BS 102 on a downlink carrier matches the PREAMBLE_INDEX, the UE 104 terminates the timer t1 of the corresponding uplink carrier and meanwhile, the other on-going RACH procedures on other uplink carriers are then terminated. If a random access preamble identifier in the random access response received from the BS 102 on a downlink carrier that matches the PREAMBLE_INDEX generated in operation 212 cannot be detected by the UE 104 before the timer T1 expires, this results in a failed RACH procedure on the uplink carrier. In some embodiments, the UE 104 then determines a number of times that a random access preamble is transmitted on the uplink carrier. If the number of times that the random access preamble is transmitted on the uplink carrier is less than N+1, wherein N is the a predefined maximum number that a random access preamble can be transmitted, the UE 104 continues to operation 302 and restart the RACH procedure on the uplink carrier again on the uplink carrier again.

In some embodiments, when the number of times that the random access preamble is transmitted on the uplink carrier is greater than N+1 (i.e., after multiple failed RACH procedures), a random access problem is reported to an upper layer, e.g., RRC layer. After the upper layer receives it, a radio link failure (RLF) is triggered and a RRC re-establishment procedure will be performed. In order to reduce access delay, the UE 104 may trigger the RACH procedure at least one more time before indicating a random access problem to the upper layer to trigger the RRC re-establishment procedure.

In some embodiments, carriers can be divided into different groups with different priorities. For example, a cell may comprise 6 uplink carriers F1 to F6 which can be configured to a UE 104. The uplink carriers F1, F2 and F3 are in group 1, while group 2 includes the uplink carriers F4, F5 and F6. In some embodiments, group 1 may have a higher priority than group 2. When a RACH is triggered, the UE 104 can initiate a RACH procedure in all the uplink carriers in group 1. When all the RACH procedures on all the carriers of group 1 are failed, i.e. the transmitting times of preamble exceed the maximum number that a random access preamble can be transmitted, the UE 104 can then initiate RACH procedures in all uplink carriers in group 2.

It should be noted FIG. 3 is an example for illustration and discussion purposes. All the RACH procedures (i.e., operations 302 and 304 on each of the uplink/downlink carrier pairs) are operated independently and any type of relative timings of each operation on each of the uplink or downlink carriers are within the scope of this invention. For example, the transmission of the random access response/contention resolution from the BS 102 to the UE 104 on F5 208 in operation 304 can occur before the transmission of the random access preamble from the UE 104 to the BS 102 on the uplink carrier F4 206 in operation 302.

Figure 4:
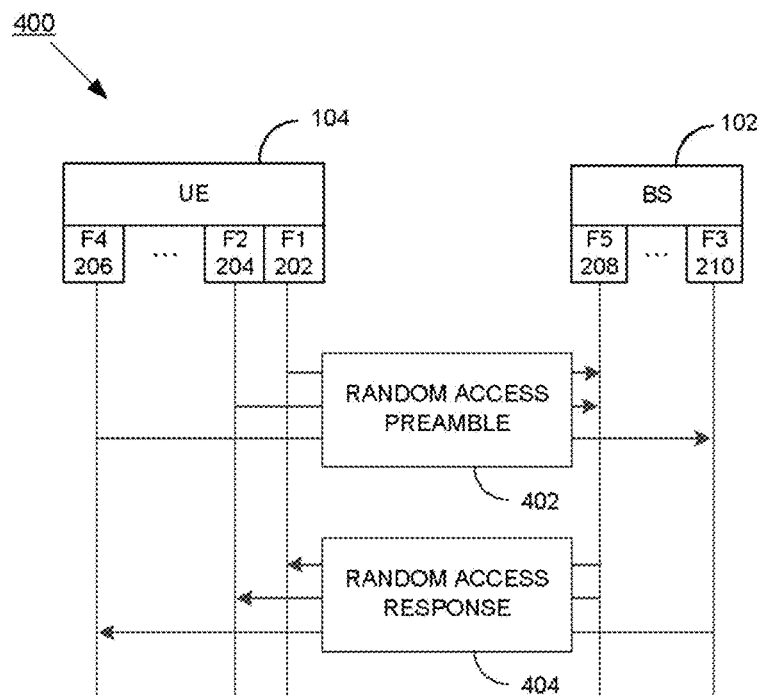
FIG. 4 illustrates a method of performing multiple 2-step contention-free RACH procedures on multiple carriers, according to some embodiments of the present disclosure.

FIG. 4 illustrates a method 400 of performing multiple 2-step contention-free RACH procedures on multiple carriers, according to some embodiments of the present disclosure. It is understood that additional operations may be provided before, during, and after the method 400 of FIG. 4, and that some other operations may be omitted or only briefly described herein. In the illustrated embodiment, there are 3 uplink carriers (i.e., F1 202, F2 204, and F4 206) and 2 downlink carriers (i.e., F3 208 and F5 210), which are configured to the UE 104 through system information or a Radio Resource Control (RRC) message. The uplink carriers F1 202 and F2 204 correspond to the downlink carrier F3

208 and the uplink carrier F4 206 corresponds to the downlink carrier F5 210. RACH configurations, e.g., random access preamble format, transmission timing and PRACH index, corresponding to each uplink carrier are also configured to the UE 104 through the system information or the RRC message. Although only 3 uplink carriers and 2 downlink carriers are shown, any desired number of uplink and downlink carriers may be included in the system while remaining within the scope of the present disclosure.

The method 400 starts with operation 402, in which the UE 104 transmits a random access preamble to the BS 102 on each of the 3 uplink carriers (i.e., F1 202, F2 204, and F4 206) according to some embodiments. In some embodiments, the random access preambles for uplink carriers are dedicated by the BS 102. In some embodiments, the UE 104 selects at least one SS (Synchronization Signal) block for transmitting the random access preambles on the uplink carriers. The at least one SS block is selected from a plurality of SS blocks received on corresponding downlink carriers by the UE 104 from the BS 102 according to its SS-RSRP (Synchronization Signal-Reference Signal Received Power) value. If a SS-RSRP value of a SS block is greater than a predefined threshold value, the SS block is selected. In some embodiments, the UE 104 selects at least one CSI-RS (Channel State Information-Reference Signal) for transmitting the random access preambles on the uplink carriers. The at least one CSI-RS is selected from a plurality of CSI-RS received on corresponding downlink carriers by the UE 104 from the BS 102 according to its CSI-RSRP value. If a CSI-RSRP of a CSI-RS is greater than a predefined threshold value, the CSI-RS is selected. The UE 104 further selects at least one PRACH (physical random access channel) occasion (i.e., time-frequency resource) according to a mapping relationship between the PRACH occasions and the SS blocks or the CSI-RSs received in the system information.

Then, the UE 104 selects a random access preamble based on the received RACH configuration from the BS 102 for each of the corresponding uplink carriers. Before transmitting the random access preamble to the BS 102, the UE 104 performs a LBT process on the selected at least one PRACH occasion on each of the uplink carriers. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., the uplink carrier is available and unoccupied).

The UE 104 then starts first transmissions of random access preambles to the BS 102 on the PRACH occasions and the corresponding uplink carriers. In some embodiments, the aforementioned processes including determining SS blocks, determining CSI-RSs, performing a LBT process on a PRACH occasion, and transmitting a random access preamble are performed separately and independently on each of the 3 uplink carriers F1 202, F2 204 and F4 206. Although it is shown that F1 202 starts the transmission of its random access preamble before the transmission on F2 204 and F4 206, the starting time for transmitting random access preambles on the corresponding uplink carriers depends on the PRACH occasion of the corresponding uplink carriers and any delay in their corresponding LBT processes. The relative timing shown in FIG. 4 is an example and is not intended to be limiting. It should be noted that any relative timing in between each of the transmission is within the scope of the present disclosure.

After a fixed duration of m symbols from the end of the first transmissions of random access preambles, the UE 104 starts a ra-Response Window timer at the start of a PDCCH (physical downlink control channel) occasion on each of the corresponding uplink carriers, wherein m is a non-negative integer. In some embodiments, there is independent re-Response Window timers for each of the 3 uplink carriers F1 202, F2 204 and F4 206, which can be started and restarted separately and independently.

To ensure reliability of the uplink carrier when the uplink carrier is determined to be unoccupied after the LBT process, in some embodiments, the UE 104 transmits the random access preamble at a preamble power with an Ra-offset value, which determined by:

PREAMBLE_RECEIVED_TARGET_POWER=ra-PreambleInitialReceivedTargetPower+DELTA_PREAMBLE+(PREAMBLE_POWER_RAMPING_COUNTER−1)*powerRampingStep+Ra-offset, wherein the ra-PreambleInitialReceivedTargetPower is an initial preamble power, the DELTA_PREAMBLE is a preamble format based offset, the PREAMBLE_POWER_RAMPING_COUNTER is the counter of preamble transmission, and it is incremented by 1 if preamble is transmitted one time, the powerRampingStep is the power-ramping factor, and the Ra-offset is a non-negative value and configured by system information and included in the RACH configuration information. In some embodiments, the Ra-offset value can be 1 decibel (dB), 2 dB, 3 dB and 4 dB and other Ra-offset values can be included and are within the scope of this invention.

The method 400 continues with operation 404 in which the BS 102 generates and transmits random access responses on downlink carriers which correspond to the 3 uplink carriers on which the random access preambles are received, according to some embodiments. In some embodiments, the BS 102 performs LBT processes on the corresponding downlink carriers to determine the availability. The BS 102 further calculates RA-RNTI (Random Access-Radio Network Temporary Identifier) values according to the time and frequency resources on which the random access preambles are transmitted. In some embodiments, there are one RA-RNTI value for each corresponding uplink carrier, which can be determined by:

RA-RNTI=1+s_id+14*t_id+14*$X$*f_id+ 14*$X$*$Y$*ul_carrier_id, wherein s_id is the index of the first OFDM symbol of the PRACH occasion (0≤s_id<14), t_id is the index of the first slot of the PRACH occasion in a system frame (0≤t_id<$X$), f_id is the index of the PRACH occasion in the frequency domain (0≤f_id<$Y$), and ul_carrier_id is the index of the uplink carrier used for the random access preamble transmission. Value of X and Y are 80 and 8 respectively. In some embodiments, ul_carrier_id=0 for the first uplink carrier F1 202; ul_carrier_id=1 for the second uplink carrier F2 204; and ul_carrier_id=2 for the third uplink carrier F1 206.

The BS 102 transmits the random access response to the UE 104 until the LBT process passes (i.e., the downlink carrier is available and unoccupied). In some embodiments, the random access response comprises a PDCCH (Physical Downlink Control Channel), which is scrambled with the corresponding RA-RNTI value. In some embodiments, the random access response is transmitted on the downlink carrier corresponding to the uplink carrier on which the random access preamble is received. Specifically, the BS 102 transmits a first and a second random access responses to the UE 104 on the downlink carrier F3 208 in response to the random access preambles received on the uplink carriers F1 202 and F2 204; and transmits a third random access response on the downlink carrier F5 210 in response to the random access preamble received on the uplink carrier F4 206. In some embodiments, the BS 102 transmits a random access response to the UE 104 on one of the downlink carriers F3 208 or F5 210, despite the uplink carrier on which the random access preamble is obtained.

In some embodiments, upon receiving the random access response and contention resolution from the BS 102 on a downlink carrier within a corresponding ra-Response Window, the UE 104 can distinguish the random access responses and their corresponding random access preambles according to the RA-RNTI value in the random access responses received from the BS 102. The UE 104 further determines whether each of the random access responses comprises a random access preamble identifier matches the index of the random access preamble (PREAMBLE_INDEX) generated in operation 212. If the random access preamble identifier in the random access response received from the BS 102 on a downlink carrier matches the PREAMBLE_INDEX, the UE 104 terminates the ra-Response Window timers of the corresponding uplink carriers and meanwhile, the other on-going RACH procedures on other uplink carriers are then terminated. If a random access preamble identifier in the random access response received from the BS 102 on a downlink carrier that matches the PREAMBLE_INDEX generated in operation 212 cannot be detected by the UE 104 before the ra-Response Window timer expires, this results in a failed RACH procedure on the uplink carrier. In some embodiments, the UE 104 then determines a number of times that a random access preamble is transmitted on the uplink carrier. If the number of times that the random access preamble is transmitted on the uplink carrier is less than N+1, wherein N is the a predefined maximum number that a random access preamble can be transmitted, the UE 104 continues to operation 402 and restart the RACH procedure on the corresponding uplink carrier again.

In some embodiments, when the number of times that the random access preamble is transmitted on the uplink carrier is greater than N+1 (i.e., after multiple failed RACH procedures), a random access problem is reported to an upper layer, e.g., RRC layer. After the upper layer receives it, a radio link failure (RLF) is triggered and a RRC re-establishment procedure will be performed. In order to reduce access delay, the UE 104 may trigger the RACH procedure at least one more time before indicating a random access problem to the upper layer to trigger the RRC re-establishment procedure.

In some embodiments, carriers can be divided into different groups with different priorities. For example, a cell may comprise 6 uplink carriers F1 to F6 which can be configured to a UE 104. The uplink carriers F1, F2 and F3 are in group 1, while group 2 includes the uplink carriers F4, F5 and F6. In some embodiments, group 1 may have a higher priority than group 2. When a RACH is triggered, the UE 104 can initiate a RACH procedure in all the uplink carriers in group 1. When all the RACH procedures on all the carriers of group 1 are failed, i.e. the transmitting times of preamble exceed the maximum number that a random access preamble can be transmitted, the UE 104 can then initiate RACH procedures in all uplink carriers in group 2.

It should be noted FIG. 4 is an example for illustration and discussion purposes. All the RACH procedures (i.e., operations 212-218 on each of the uplink/downlink pairs) are operated independently and any type of relative timings of each operation on each of the uplink or downlink carriers are within the scope of this invention. For example, the transmission of the random access response from the BS 102 to the UE 104 on the downlink carrier F5 208 in operation 404 can occur before the transmission of the random access preamble from the UE 104 to the BS 102 on the uplink carrier F4 206 in operation 402.

Figure 5:
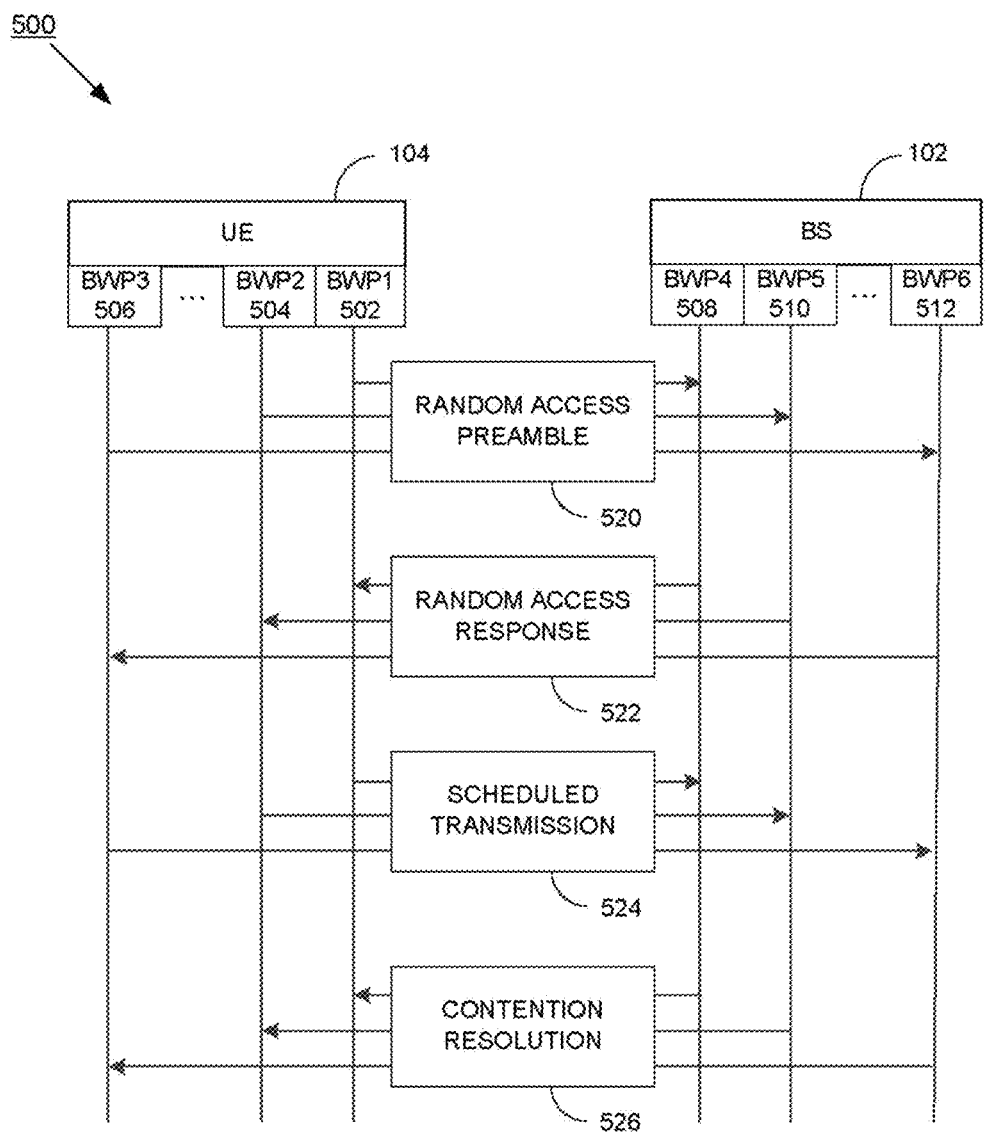
FIG. 5 illustrates a method of performing multiple 4-step contention-based RACH procedures on multiple bandwidth parts, according to some embodiments of the present disclosure.

FIG. 5 illustrates a method 500 of performing multiple 4-step contention-based RACH procedures on multiple bandwidth parts, according to some embodiments of the present disclosure. It is understood that additional operations may be provided before, during, and after the method 500 of FIG. 5, and that some other operations may be omitted or only briefly described herein. In the illustrated embodiment, there are 3 uplink bandwidth parts (i.e., BWP1 502, BWP2 504, and BWP3 506) and 3 downlink BWPs (i.e., BWP4 508, BWP5 510, and BWP6 512), which are configured to the UE 104 through system information or a Radio Resource Control (RRC) message. The uplink BWP1 502, BWP2 504 and BWP3 506 correspond to the downlink BWP4 508, BWP 510 and BWP 512, respectively. Further, RACH configurations, e.g., random access preamble format, transmission timing and PRACH index, corresponding to each uplink carrier are also configured to the UE 104 through the system information or the RRC message. Although only 3 uplink BWPs and 3 downlink BWPs are shown, any desired number of uplink and downlink carriers may be included in the system while remaining within the scope of the present disclosure.

The method 500 starts with operation 520, in which the UE 104 transmits a random access preamble to the BS 102 on each of the 3 uplink BWPs (i.e., BWP1 502, BWP2 504, and BWP3 506) according to some embodiments. In some embodiments, the UE 104 selects at least one SS (synchronization signal) block for transmitting the random access preambles on the uplink BWPs. The at least one SS block is selected from a plurality of SS blocks received on a corresponding downlink carrier by the UE 104 from the BS 102 according to its according to the SS-RSRP (Synchronization Signal-Reference Signal Received Power) values. If SS-RSRP values are greater than a predefined threshold value, the SS block is selected. The UE 104 further selects at least one PRACH (physical random access channel) occasion (i.e., time-frequency resource) according to a mapping relationship between the PRACH occasions and the SS blocks received in the system information. Then, the UE 104 selects a random access preamble based on the received RACH configuration for each of the corresponding uplink carriers. Before transmitting the random access preamble to the BS 102, the UE 104 performs a LBT process on the selected at least one PRACH occasion on each of the uplink carriers. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., the uplink carrier is available and unoccupied).

The UE 104 then starts first transmissions of random access preambles to the BS 102 on the PRACH occasion and the corresponding uplink carriers. In some embodiments, the aforementioned processes including determining SS blocks, performing a LBT process on a PRACH occasion and transmitting a random access preamble are performed separately and independently on each of the 3 uplink BWPs (i.e., BWP1 502, BWP2 504, and BWP3 506). Although it is shown that the transmission of its random access preamble on the first BWP1 502 starts before the transmission on the second BWP2 504, and the third BWP3 506, the starting time for transmitting random access preambles on the corresponding uplink BWPs depends on the PRACH occasions of the corresponding uplink carriers and any delay in their corresponding LBT processes before transmitting. The relative timing shown in FIG. 2 is an example and is not intended to be limiting. It should be noted that any relative timing in transmitting random access preambles on the uplink carriers are within the scope of the present disclosure.

After a fixed duration of m symbols from the end of the first transmissions of random access preambles, the UE 104 starts a ra-Response Window timer at the start of a PDCCH (physical downlink control channel) occasion on each of the corresponding uplink carriers, wherein m is a non-negative integer. In some embodiments, there is independent re-Response Window timers for each of the 3 uplink BWPs (i.e., BWP1 502, BWP2 504, and BWP3 506), which can be started and restarted separately and independently.

To ensure reliability of the uplink BWPs when the uplink BWPs are determined to be unoccupied after the LBT processes, in some embodiments, the UE 104 transmits the random access preambles at a preamble power with an Ra-offset value, which determined by:

PREAMBLE_RECEIVED_TARGET_POWER=ra-PreambleInitialReceivedTargetPower+DELTA_PREAMBLE+(PREAMBLE_POWER_RAMPING_COUNTER−1)*powerRampingStep+Ra-offset, wherein the ra-PreambleInitialReceivedTargetPower is an initial preamble power, the DELTA_PREAMBLE is a preamble format based offset, the PREAMBLE_POWER_RAMPING_COUNTER is the counter of preamble transmission, and it is incremented by 1 if preamble is transmitted one time, the powerRampingStep is the power-ramping factor, and the Ra-offset is a non-negative value and configured by system information and included in the RACH configuration information. In some embodiments, the Ra-offset value can be 1 decibel (dB), 2 dB, 3 dB and 4 dB and other Ra-offset values can be included and are within the scope of this invention.

The method 500 continues with operation 522 in which the BS 102 generates and transmits random access responses on downlink BWPs which correspond to the 3 uplink BWPs on which the random access preambles are received, according to some embodiments. In some embodiments, the BS 102 performs LBT processes the corresponding downlink carriers to determine the availability. The BS 102 further calculates RA-RNTI (Random Access-Radio Network Temporary Identifier) values according to the time and frequency resources on which the random access preambles are transmitted. In some embodiments, there are one RA-RNTI value for each corresponding uplink carrier, which can be determined by:

RA-RNTI=1+s_id+14*t_id+14*X*f_id+14*X*Y*ul_carrier_id+Z*BWP index, wherein s_id is the index of the first OFDM symbol of the PRACH occasion (0≤s_id<14), t_id is the index of the first slot of the PRACH occasion in a system frame (0≤t_id<X), f_id is the index of the PRACH occasion in the frequency domain (0≤f_id<Y), Value of X and Y are 80 and 8 respectively. In some embodiments, Z equals to 1. In some embodiments, Z equals to 14*X*Y. In some embodiments, ul-carrier_id is the index of the uplink carrier in which the uplink BWPs are located and the BWP index is the BWP index of the uplink BWPs in the corresponding uplink carriers used for the random access preamble transmission. For example, there can be 3 uplink carriers and each comprises 3 uplink BWPs. In some embodiments, ul_carrier_id=0 for the first uplink carrier; ul_carrier_id=1 for the second uplink carrier; and ul_carrier_id=2 for the third uplink carrier. In each of the uplink carriers, BWP index=0, 1, and 2 for the first, second and third uplink BWPs (e.g., BWP1 502, BWP2 504 and BWP3 506) of the corresponding uplink carrier.

The BS 102 transmits the random access response to the UE 104 until the LBT process passes on the downlink BWP (i.e., the downlink BWP is available and unoccupied). In some embodiments, the random access response comprises a PDCCH (Physical Downlink Control Channel), which is scrambled with the corresponding RA-RNTI value. In some embodiments, the random access response is transmitted on the downlink carrier corresponding to the uplink carrier on which the random access preamble is received. Specifically, the BS 102 transmits a first random access responses to the UE 104 on the downlink BWP4 508 in response to the random access preambles received on the uplink BWP1 502; transmits a second random access responses to the UE 104 on the downlink BWP5 510 in response to the random access preambles received on the uplink BWP2 504; and transmits a third random access response on the downlink BWP 512 in response to the random access preamble received on the uplink BWP3 508. In some embodiments, the BS 102 transmits a random access response to the UE 104 on one of the downlink BWPs (i.e., BWP4 508, BWP5 510 and BWP6 512), despite the uplink BWP on which the random access preamble is transmitted.

In some embodiments, because of the opportunity occupation characteristic, a random access response may be delayed and may lead to an expiration of a ra-ResponseWindow timer. When the ra-ResponseWindow timer expires, the UE 104 cannot receive the random access response from the BS 102, which results in a failed RACH procedure. In some embodiments, the ra-ResponseWindow timer can be increased to prevent frequent failure of a RACH procedure due to the time delay in the LBT process. In some embodiments, a ra-ResponseWindow timer can be selected from a predefined matrix, wherein the matrix comprises [sl 1, sl 2, sl 4, sl 8, sl 10, sl 20, sl 40, sl 80, sl 88]. In some other embodiments, the matrix comprises [sl 1, sl 2, sl 4, sl 8, sl 10, sl 20, sl 40, sl 80, sl 96], wherein each element in the matrix indicates a number of slots that a ra-Response Window timer covers. For example, sl 1 indicates 1 slot for a ra-response Window timer, which equals to 1 millisecond (ms) and sl 96 indicates 96 slots for a ra-Response Window timer, which equals to 12 ms.

The method 500 continues with operation 524 in which the UE 104 perform scheduled transmissions on the corresponding uplink carriers that are used for transmitting the random access preambles, according to some embodiments. In some embodiments, upon receiving the random access responses from the BS 102 on the downlink BWPs within corresponding ra-Response Window timers. The UE 104 can distinguish the random access responses and their corresponding random access preambles according to the RA-RNTI values in the random access responses received from the BS 102. The UE 104 further determines whether each of the random access responses comprises a random access preamble identifier which matches the index of the random access preamble (PREAMBLE_INDEX) generated in operation 520. If the random access preamble identifier in the random access response received from the BS 102 on a downlink carrier matches the PREAMBLE_INDEX, the UE 104 terminates the ra-Response Window timer of the corresponding uplink BWP. If a random access preamble identifier in the random access response received from the BS 102 on a downlink BWP that matches the PREAMBLE_INDEX generated in operation 520 cannot be detected by the UE 104 before the ra-Response Window timer expires, this results in a failed RACH procedure on the uplink BWP. In some embodiments, the UE 104 then determines a number of times that a random access preamble is transmitted on the uplink BWP. If the number of times that the random access preamble is transmitted on the uplink BWP is less than N+1, wherein N is the a predefined maximum number that a random access preamble can be transmitted on an uplink BWP, the UE 104 continues to operation 520 and restart the RACH procedure on the corresponding uplink BWP again.

When the random access preamble identifier in the random access response received from the BS 102 on a downlink BWP matches the PREAMBLE_INDEX and the ra-Response Window timer is terminated, the UE 104 perform a LBT process until an unoccupied uplink BWP is determined. The UE further perform a scheduled transmission on the uplink BWP on which the random access preamble is transmitted. Upon completing the scheduled transmission, the UE 104 starts or restarts a ra-ContentionResolutionTimer corresponding to each of the 3 uplink BWPs at each of the HARQ (hybrid Automatic Repeat Request) retransmission. In some embodiments, the ra-ContentionResolutionTimer for each corresponding uplink BWP can be independently started or restarted.

In some embodiments, slot aggregation can be used to ensure the reliability, in which the schedule transmission is transmitted multiple times on different resources in the time domain. In some embodiments, parameters for slot aggregation including repetition (repK) and repetition redundancy version (repK-RV) can be added in a UL (uplink) grant transmitted in the random access response from the BS 102. In some embodiments, the repK indicates the number or repetitions and repK-RV indicates the sequence to be used if repetitions are used. In some embodiments, repK and repK-RV comprise 2 bits. In some embodiment, repK comprises 4 positive values, including 1, 2, 4, and 8. In some other embodiments, different values of repK can be included and are within the scope of this invention. In some embodiments, repK and repK-RV can be configured to the UE 104 by system information. The UE 104 transmits the scheduled transmission using repK and repK-RV.

The method 500 continues with operation 526 in which the BS 102 generates contention resolution messages and transmits back to the UE 104 on corresponding downlink BWPs, according to some embodiments. In some embodiments, the BS 102 perform a LBT process to determine the availability of the downlink BWPs before transmitting the contention resolution messages. If the UE 104 receives the contention resolution messages within corresponding ra-ContentionResolutionTimers of the corresponding uplink BWPs, the UE 104 stops the ra-ContentionResolutionTimers of the corresponding uplink carriers and meanwhile, the other on-going RACH procedures on other BWPs are then terminated. If the UE 104 does not receive the contention resolution message within the corresponding ra-ContentionResolutionTimer of the corresponding uplink carrier from the BS 102 and if the number of times that the random access preamble is transmitted on the uplink BWP is less than N+1, wherein N is the a predefined maximum number that a random access preamble can be transmitted on a uplink BWP, the UE 104 continues to operation 502 and restart the RACH procedure on the uplink BWP again.

In some embodiments, when the number of times that the random access preamble is transmitted on the uplink carrier is greater than N+1 (i.e., after multiple failed RACH procedures), a random access problem is reported to an upper layer, e.g., RRC layer. After the upper layer receives it, a radio link failure (RLF) is triggered and a RRC re-establishment procedure will be performed. In order to reduce access delay, the UE 104 may trigger the RACH procedure at least one more time before indicating a random access problem to the upper layer to trigger the RRC re-establishment procedure.

In some embodiments, BWPs can be divided into different groups with different priorities. For example, a cell may comprise 6 uplink BWPs (i.e., BWP1 to BWP6) which can be configured to a UE 104. The uplink BWPs BWP1, BWP2, and BWP3 are in group 1, while group 2 includes the uplink BWPs BWP4, BWP5 and BWP6. In some embodiments, group 1 may have a higher priority than group 2. When a RACH is triggered, the UE 104 can initiate a RACH procedure in all the uplink BWPs in group 1. When all the RACH procedures on all the uplink BWPs of group 1 are failed, i.e. the transmitting times of preamble exceed the maximum number that a random access preamble can be transmitted, the UE 104 can then initiate RACH procedures in all uplink BWPs in group 2.

It should be noted FIG. 5 is an example for illustration and discussion purposes. All the RACH procedures (i.e., operations 520-526 on each of the uplink/downlink BWP pairs) are operated independently and any type of relative timings of each operation on each of the uplink or downlink BWPs are within the scope of this invention. For example, the transmission of the random access response from the BS 102 to the UE 10 the downlink BWP4 508 in operation 522 can occur before the transmission of the random access preamble from the UE 104 to the BS 102 on the uplink BWP1 502 in operation 520.

Figure 6:
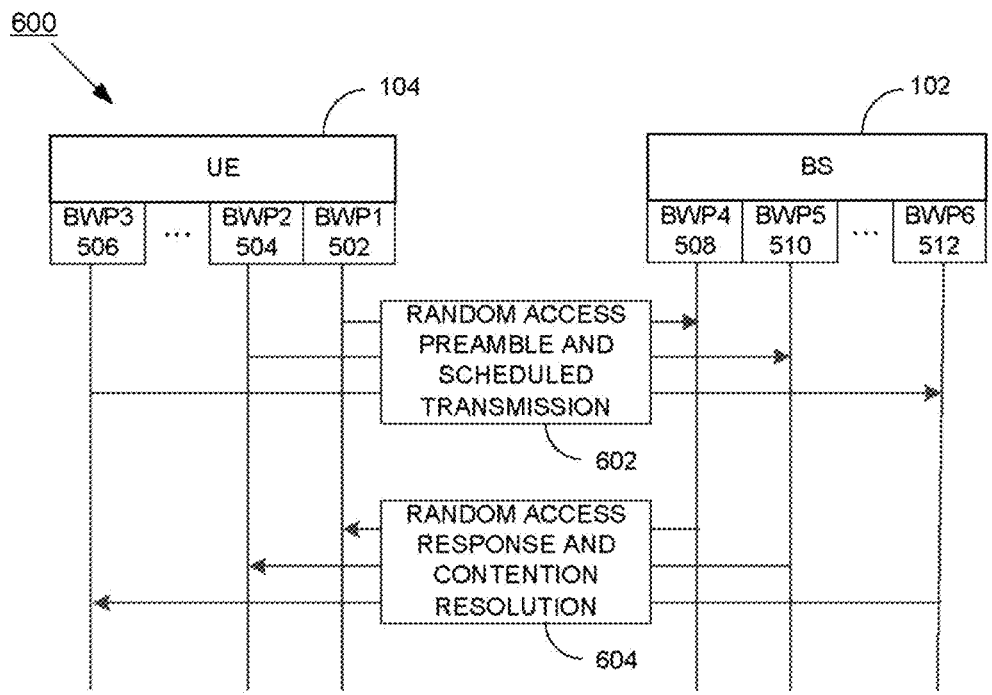
FIG. 6 illustrates a method of performing multiple 2-step contention-based RACH procedures on multiple bandwidth parts, according to some embodiments of the present disclosure.

FIG. 6 illustrates a method 600 of performing multiple 2-step contention-based RACH procedures on multiple bandwidth parts, according to some embodiments of the present disclosure. In the illustrated embodiment, there are 3 uplink bandwidth parts (i.e., BWP1 502, BWP2 504, and BWP3 506) and 3 downlink BWPs (i.e., BWP4 508, BWP5 510, and BWP6 512), which are configured to the UE 104 through system information or a Radio Resource Control (RRC) message. The uplink BWP1 502, BWP2 504 and BWP3 506 correspond to the downlink BWP4 508, BWP 510 and BWP 512, respectively. Further, RACH configurations, e.g., random access preamble format, transmission timing and PRACH index, corresponding to each uplink carrier are also configured to the UE 104 through the system information or the RRC message. Although only 3 uplink BWPs and 3 downlink BWPs are shown, any desired number of uplink and downlink carriers may be included in the system while remaining within the scope of the present disclosure.

The method 600 starts with operation 602, in which the UE 104 transmits random access preambles and scheduled transmissions to the BS 102 on each of the 3 uplink BWPs (i.e., BWP1 502, BWP2 504, and BWP3 506) according to some embodiments. In some embodiments, the UE 104 selects at least one SS (Synchronization Signal) block for transmitting the random access preambles on the uplink BWPs. The at least one SS block is selected from a plurality of SS blocks received on a corresponding downlink BWPs by the UE 104 from the BS 102 according to its the SS-RSRP (Synchronization Signal-Reference Signal Received Power) values. If SS-RSRP values are greater than a predefined threshold value, the SS block is selected. The UE 104 further determines at least one PRACH (physical random access channel) occasion (i.e., time-frequency resource) according to a mapping relationship between the PRACH occasions and the SS blocks received in the system information. Then, the UE 104 selects a random access preambles based on the received RACH configuration for each of the corresponding uplink BWPs. Before transmitting the random access preamble to the BS 102, the UE 104 performs a LBT process on each of the uplink BWPs. In some embodiments, the LBT process comprises sensing interference and bursty arrivals of packets through its transmitters to determine interference level and traffic loads on the uplink BWP. If the LBT process fails, the UE 104 restarts the LBT process at the following PRACH occasion on the corresponding uplink BWP until the LBT process passes (i.e., the uplink BWP is available and unoccupied).

The UE 104 then starts first transmissions of random access preambles to the BS 102 on the PRACH occasion and the corresponding uplink carriers. In some embodiments, the aforementioned processes including determining SS blocks, performing a LBT process, and transmitting a random access preamble are performed separately and independently on each of the 3 uplink BWPs. Although it is shown that the transmission of the random access preamble and scheduled transmission in operation 602 on the first uplink BWP1 502 starts before the transmission on the second and third uplink BWP2 504 and BWP 506, the starting time for transmitting random access preambles and scheduled transmission on the corresponding uplink BWPs depends on the PRACH occasions of the corresponding uplink carriers and any delay in their corresponding LBT processes. The relative timing shown in FIG. 6 is an example and is not intended to be limiting. It should be noted that any relative timing in transmitting the random access preambles and schedule transmission on the uplink BWPs are within the scope of the present disclosure.

After a fixed duration of m symbols from the end of the first transmissions of random access preambles, the UE 104 starts a timer at the start of a PDCCH (physical downlink control channel) occasion on each of the corresponding uplink carriers, wherein m is a non-negative integer. In some embodiments, there are an independent timer for each of the 3 uplink BPWs, which can be started and restarted separately and independently.

To ensure reliability of the uplink carrier when the uplink carrier is determined to be unoccupied after the LBT process, in some embodiments, the UE 104 transmits the random access preamble and schedule transmission at a preamble power with an Ra-offset value, which determined by:

PREAMBLE_RECEIVED_TARGET_POWER=ra-PreambleInitialReceivedTargetPower+DELTA_PREAMBLE+(PREAMBLE_POWER_RAMPING_COUNTER−1)*powerRampingStep+Ra-offset, wherein the ra-PreambleInitialReceivedTargetPower is an initial preamble power, the DELTA_PREAMBLE is a preamble format based offset, the PREAMBLE_POWER_RAMPING_COUNTER is the counter of preamble transmission, and it is incremented by 1 if preamble is transmitted one time, the powerRampingStep is the power-ramping factor, and the Ra-offset is a non-negative value and configured by system information and included in the RACH configuration information. In some embodiments, the Ra-offset value can be 1 decibel (dB), 2 dB, 3 dB and 4 dB and other Ra-offset values can be included and are within the scope of this invention.

The method 600 continues with operation 604 in which the BS 102 generates and transmits random access responses and contention resolution on downlink BWPs which correspond to the 3 uplink BWPs on which the random access preambles are received, according to some embodiments. In some embodiments, the BS 102 performs LBT processes on the corresponding downlink BWPs to determine the availability. The BS 102 further calculates RA-RNTI (Random Access-Radio Network Temporary Identifier) values according to the time and frequency resources on which the random access preambles are transmitted. In some embodiments, there are one RA-RNTI value for each corresponding uplink BWP, which can be determined by:

RA-RNTI=1+s_id+14*t_id+14*X*f_id+ 14*X*Y*ul_carrier_id+Z*BWP index, wherein s_id is the index of the first OFDM symbol of the PRACH occasion (0≤s_id<14), t_id is the index of the first slot of the PRACH occasion in a system frame (0≤t_id<X), f_id is the index of the PRACH occasion in the frequency domain (0≤f_id<Y). Value of X and Y are 80 and 8 respectively. In some embodiments, Z equals to 1. In some embodiments, Z equals to 14*X*Y. In some embodiments, ul-carrier_id is the index of the uplink carrier in which the uplink BWPs are located and the BWP index is the BWP index of the uplink BWPs in the corresponding uplink carriers used for the random access preamble transmission. For example, there can be 3 uplink carriers and each comprises 3 uplink BWPs. In some embodiments, ul_carrier_id=0 for the first uplink carrier; ul_carrier_id=1 for the second uplink carrier; and ul_carrier_id=2 for the third uplink carrier. In each of the uplink carriers, BWP index=0, 1, and 2 for the first, second and third uplink BWPs (e.g., BWP1 502, BWP2 504 and BWP3 506) of the corresponding uplink carrier.

The BS 102 transmits the random access response and contention resolution to the UE 104 until the LBT process passes (i.e., the downlink BWP is available and unoccupied). In some embodiments, the random access response comprises a PDCCH (Physical Downlink Control Channel), which is scrambled with the corresponding RA-RNTI value. In some embodiments, the random access response is transmitted on the downlink carrier corresponding to the uplink carrier on which the random access preamble is received. Specifically, the BS 102 transmits a first random access response and contention resolution to the UE 104 on the first downlink BWP4 508 in response to the random access preambles and scheduled transmission received on the first uplink BWP1 502; transmits a second random access response and contention resolution to the UE 104 on the second downlink BWP5 510 in response to the random access preambles and scheduled transmission received on the second uplink BWP2 504; and transmits a third random access response and contention resolution to the UE 104 on the third downlink BWP6 512 in response to the random access preambles and scheduled transmission received on the third uplink BWP3 506. In some embodiments, the BS 102 transmits a random access response to the UE 104 on one of the downlink BWPs, despite the uplink BWPs on which the random access preambles are obtained.

In some embodiments, upon receiving the random access response and contention resolution from the BS 102 on a downlink BWP within a corresponding timer T1, the UE 104 can distinguish the random access responses and their corresponding random access preambles according to the RA-RNTI value in the random access responses received from the BS 102. The UE 104 further determines whether each of the random access responses comprises a random access preamble identifier which matches the index of the random access preamble (PREAMBLE_INDEX) generated in operation 602. If the random access preamble identifier in the random access response received from the BS 102 on a downlink BWP matches the PREAMBLE_INDEX, the UE 104 terminates the timer t1 of the corresponding uplink BWP and meanwhile, the other on-going RACH procedures on other uplink BWPs are then terminated. If a random access preamble identifier in the random access response received from the BS 102 on a downlink carrier that matches the PREAMBLE_INDEX generated in operation 602 cannot be detected by the UE 104 before the timer t1 expires, this results in a failed RACH procedure on the uplink BWP. In some embodiments, the UE 104 then determines a number of times that a random access preamble is transmitted on the uplink BWP. If the number of times that the random access preamble is transmitted on the uplink BWP is less than N+1, wherein N is the a predefined maximum number that a random access preamble can be transmitted, on an uplink BWP, the UE 104 continues to operation 602 and restart the RACH procedure on the corresponding uplink BWP.

In some embodiments, when the number of times that the random access preamble is transmitted on the uplink BWP is greater than N+1 (i.e., after multiple failed RACH procedures), a random access problem is reported to an upper layer, e.g., RRC layer. After the upper layer receives it, a radio link failure (RLF) is triggered and a RRC re-establishment procedure will be performed. In order to reduce access delay, the UE 104 may trigger the RACH procedure at least one more time before indicating a random access problem to the upper layer to trigger the RRC re-establishment procedure.

In some embodiments, BWPs can be divided into different groups with different priorities. For example, a cell may comprise 6 uplink BWPs (i.e., BWP1 to BWP6) which can be configured to a UE 104. The uplink BWPs BW1, BWP2, BWP3 are in group 1, while group 2 includes the uplink BWPs BWP4, BWP5 and BWP6. In some embodiments, group 1 may have a higher priority than group 2. When a RACH is triggered, the UE 104 can initiate a RACH procedure in all the uplink carriers in group 1. When all the RACH procedures on all the carriers of group 1 are failed, i.e. the transmitting times of preamble exceed the maximum number that a random access preamble can be transmitted, the UE 104 can then initiate RACH procedures in all uplink carriers in group 2.

It should be noted FIG. 6 is an example for illustration and discussion purposes. All the RACH procedures (i.e., operations 602 and 604 on each of the uplink/downlink BWPs) are operated independently and any type of relative timings of each operation on each of the uplink or downlink BPWs are within the scope of this invention. For example, the transmission of the random access response/contention resolution from the BS 102 to the UE 104 on BWP4 508 in operation 604 can occur before the transmission of the random access preamble and scheduled transmission from the UE 104 to the BS 102 on the uplink BWP3 in operation 602.

Figure 7:
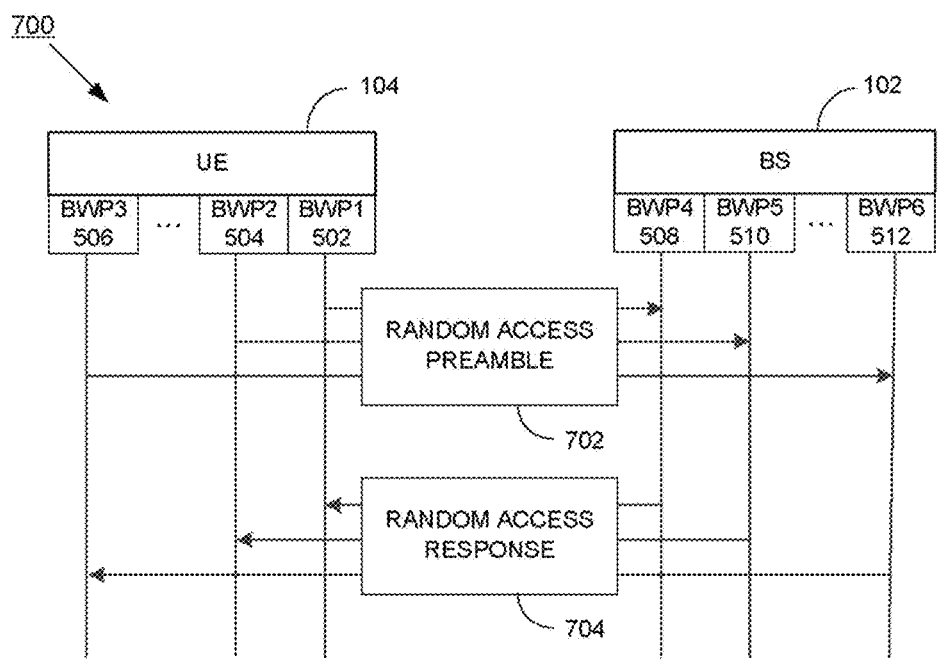
FIG. 7 illustrates a method of performing multiple 2-step contention-free RACH procedures on multiple bandwidth parts, according to some embodiments of the present disclosure.

FIG. 7 illustrates a method 700 of performing multiple 2-step contention-free RACH procedures on multiple bandwidth parts, according to some embodiments of the present disclosure. In the illustrated embodiment, there are 3 uplink bandwidth parts (i.e., BWP1 502, BWP2 504, and BWP3 506) and 3 downlink BWPs (i.e., BWP4 508, BWP5 510, and BWP6 512), which are configured to the UE 104 through system information or a Radio Resource Control (RRC) message. The uplink BWP1 502, BWP2 504 and BWP3 506 correspond to the downlink BWP4 508, BWP 510 and BWP 512, respectively. Further, RACH configurations, e.g., random access preamble format, transmission timing and PRACH index, corresponding to each uplink carrier are also configured to the UE 104 through the system information or the RRC message. Although only 3 uplink BWPs and 3 downlink BWPs are shown, any desired number of uplink and downlink carriers may be included in the system while remaining within the scope of the present disclosure.

The method 600 starts with operation 602, in which the UE 104 transmits a random access preamble to the BS 102 on each of the 3 uplink BWPs (i.e., BWP1 502, BWP2 504, and BWP3 506) according to some embodiments. In some embodiments, the random access preambles for uplink BWPs are dedicated by the BS 102. In some embodiments, the UE 104 selects at least one SS (Synchronization Signal) block for transmitting the random access preambles on the uplink BWPs. The at least one SS block is selected from a plurality of SS blocks received on corresponding downlink BWPs by the UE 104 from the BS 102 according to its SS-RSRP (Synchronization-signal-Reference Signal Received Power) value. If a SS-RSRP value of a SS block is greater than a predefined threshold value, the SS block is selected. In some embodiments, the UE 104 can select at least one CSI-RS (Channel State Information-Reference Signal) for transmitting the random access preambles on the uplink BWPs. The at least one CSI-RS is selected from a plurality of CSI-RS received on corresponding downlink BWP by the UE 104 from the BS 102 according to its CSI-RSRP value. If a CSI-RSRP of a CSI-RS is greater than a predefined threshold value, the CSI-RS is selected. The UE 104 further selects at least one PRACH (physical random access channel) occasion (i.e., time-frequency resource) according to a mapping relationship between the PRACH occasions and the SS blocks or the CSI-RSs received in the system information.

Then, the UE 104 selects a random access preamble based on the received RACH configuration for each of the corresponding uplink BWPs. Before transmitting the random access preamble to the BS 102, the UE 104 performs a LBT process on each of the uplink carriers. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink BWP until the LBT process passes (i.e., the uplink BWP is available and unoccupied).

The UE 104 then starts first transmissions of random access preambles to the BS 102 on the PRACH occasions and the corresponding uplink BWPs. In some embodiments, the aforementioned processes including determining SS blocks, determining CSI-RSs, performing a LBT process, and transmitting a random access preamble on a PRACH occasion are performed separately and independently on each of the 3 uplink BWPs. Although it is shown that the transmission of the random access preamble on the first uplink BWP1 502 starts before the transmission on the second and the third BWP2 504 and BWP3 506, the starting timing for transmitting random access preambles on the corresponding uplink BWPs depends on the PRACH occasions of the corresponding uplink carriers and any delay in their corresponding LBT processes. The relative timing shown in FIG. 7 is an example and is not intended to be limiting. It should be noted that any relative timing in between each of the transmission in each operation on uplink BWPs is within the scope of the present disclosure.

After a fixed duration of m symbols from the end of the first transmissions of random access preambles, the UE 104 starts a ra-Response Window timer at the start of a PDCCH (physical downlink control channel) occasion on each of the corresponding uplink carriers, wherein m is a non-negative integer. In some embodiments, there is independent re-Response Window timers for each of the 3 uplink BWPs, which can be started and restarted separately and independently.

To ensure reliability of the uplink BWP when the uplink BWP is determined to be unoccupied after the LBT process, in some embodiments, the UE 104 transmits the random access preamble at a preamble power with an Ra-offset value, which determined by:

PREAMBLE_RECEIVED_TARGET_POWER=ra-PreambleInitialReceivedTargetPower+DELTA_PREAMBLE+(PREAMBLE_POWER_RAMPING_COUNTER−1)*powerRampingStep+Ra-offset, wherein the ra-PreambleInitialReceivedTargetPower is an initial preamble power, the DELTA_PREAMBLE is a preamble format based offset, the PREAMBLE_POWER_RAMPING_COUNTER is the counter of preamble transmission, and it is incremented by 1 if preamble is transmitted one time, the powerRampingStep is the power-ramping factor, and the Ra-offset is a non-negative value and configured by system information and included in the RACH configuration information. In some embodiments, the Ra-offset value can be 1 decibel (dB), 2 dB, 3 dB and 4 dB and other Ra-offset values can be included and are within the scope of this invention.

The method 700 continues with operation 704 in which the BS 102 generates and transmits random access responses on downlink BWPs corresponding to the 3 uplink BWPs on which the random access preambles are received, according to some embodiments. In some embodiments, the BS 102 performs LBT processes on the corresponding downlink BWPs to determine the availability. The BS 102 further calculates RA-RNTI (Random Access-Radio Network Temporary Identifier) values according to the time and frequency resources on which the random access preambles are transmitted. In some embodiments, there are one RA-RNTI value for each corresponding uplink carrier, which can be determined by:

RA-RNTI=1+s_id+14*t_id+14*$X$*f_id+14*$X$*$Y$*ul_carrier_id+Z*BWP index, wherein s_id is the index of the first OFDM symbol of the PRACH occasion (0≤s_id<14), t_id is the index of the first slot of the PRACH occasion in a system frame (0≤t_id<X), f_id is the index of the PRACH occasion in the frequency domain (0≤f_id<Y). Value of X and Y are 80 and 8 respectively. In some embodiments, Z equals to 1. In some embodiments, Z equals to 14*X*Y. In some embodiments, ul-carrier_id is the index of the uplink carrier in which the uplink BWPs are located and the BWP index is the BWP index of the uplink BWPs in the corresponding uplink carriers used for the random access preamble transmission. For example, there can be 3 uplink carriers and each comprises 3 uplink BWPs. In some embodiments, ul_carrier_id=0 for the first uplink carrier; ul_carrier_id=1 for the second uplink carrier; and ul_carrier_id=2 for the third uplink carrier. In each of the uplink carriers, BWP index=0, 1, and 2 for the first, second and third uplink BWPs (e.g., BWP1 502, BWP2 504 and BWP3 506) of the corresponding uplink carrier.

The BS 102 transmits the random access response to the UE 104 until the LBT process passes (i.e., the downlink BWP is available and unoccupied). In some embodiments, the random access response comprises a PDCCH (Physical Downlink Control Channel), which is scrambled with the corresponding RA-RNTI value. In some embodiments, the random access response is transmitted on the downlink BWP corresponding to the uplink BWP on which the random access preamble is received. Specifically, the BS 102 transmits a first random access responses to the UE 104 on the first downlink BWP4 508 in response to the random access preambles received on the first uplink BWP1 502; transmits a second random access responses to the UE 104 on the second downlink BWP5 510 in response to the random access preambles received on the second uplink BWP2 504; and transmits a third random access response on the third downlink BWP6 512 in response to the random access preamble received on the third uplink BWP3 506. In some embodiments, the BS 102 transmits a random access response to the UE 104 on one of the downlink BWPs, despite the uplink BWPs on which the random access preambles are obtained.

In some embodiments, upon receiving the random access response from the BS 102 on a downlink BWP within a corresponding ra-ResponseWindow timer, the UE 104 can distinguish the random access responses and their corresponding random access preambles according to the RA-RNTI value in the random access responses received from the BS 102. The UE 104 further determines whether each of the random access responses comprises a random access preamble identifier which matches the index of the random access preamble (PREAMBLE_INDEX) generated in operation 702. If the random access preamble identifier in the random access response received from the BS 102 on the downlink BWP matches the PREAMBLE_INDEX, the UE 104 terminates the ra-ResponseWindow timers of the corresponding uplink BWPs and meanwhile, the other on-going RACH procedures on the other uplink BWPs are then terminated. If a random access preamble identifier in the random access response received from the BS 102 on a downlink BWP that matches the PREAMBLE_INDEX generated in operation 702 cannot be detected by the UE 104 before the ra-Response Window timer expires, this results in a failed RACH procedure on the uplink BWP. In some embodiments, the UE 104 then determines a number of times that a random access preamble is transmitted on the uplink BWP. If the number of times that the random access preamble is transmitted on the uplink BWP is less than N+1, wherein N is the a predefined maximum number that a random access preamble can be transmitted on an uplink BWP, the UE 104 continues to operation 702 and restart the RACH procedure on the corresponding uplink BWP again.

In some embodiments, when the number of times that the random access preamble is transmitted on the uplink BWP is greater than N+1 (i.e., after multiple failed RACH procedures), a random access problem is reported to an upper layer, e.g., RRC layer. After the upper layer receives it, a radio link failure (RLF) is triggered and a RRC re-establishment procedure will be performed. In order to reduce access delay, the UE 104 may trigger the RACH procedure at least one more time before indicating a random access problem to the upper layer to trigger the RRC re-establishment procedure.

In some embodiments, BWPs can be divided into different groups with different priorities. For example, a cell may comprise 6 uplink BWPs (i.e., BWP1 to BWP6) which can be configured to a UE 104. The uplink BWPs BW1, BWP2, BWP3 are in group 1, while group 2 includes the uplink BWPs BWP4, BWP5 and BWP6. In some embodiments, group 1 may have a higher priority than group 2. When a RACH is triggered, the UE 104 can initiate a RACH procedure in all the uplink carriers in group 1. When all the RACH procedures on all the carriers of group 1 are failed, i.e. the transmitting times of preamble exceed the maximum number that a random access preamble can be transmitted, the UE 104 can then initiate RACH procedures in all uplink carriers in group 2.

It should be noted that FIG. 7 is an example for illustration and discussion purposes. All the RACH procedures (i.e., operations 702 and 704 on each of the uplink/downlink BWPs) are operated independently and any type of relative timings of each operation on each of the uplink or downlink BPWs are within the scope of this invention. For example, the transmission of the random access response from the BS 102 to the UE 104 on the downlink BWP4 508 in operation 704 can occur before the transmission of the random access preamble from the UE 104 to the BS 102 on the uplink BWP3 506 in operation 702.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a wireless communication node, comprising:
    performing a plurality of random access (RACH) procedures with a wireless communication device on a first frequency resource set and a second frequency resource set, wherein the plurality of RACH procedures each comprises:
    receiving a first message on a first frequency resource from the wireless communication device, wherein the first frequency resource is selected from the first frequency resource set;
    transmitting a second message on a second frequency resource to the wireless communication device within a predetermined time window, wherein the second frequency resource is selected from the second frequency resource set;
    receiving a third message on the first frequency resource from the wireless communication device, the third message triggering a timer; and
    transmitting a fourth message on a third frequency resource to the wireless communication device, wherein the third frequency resource is selected from the second frequency resource set; and
    based on a receiving of the fourth message of one of the plurality of RACH procedures by the wireless communication device prior to expiration of the timer, terminating the rest of the plurality of RACH procedures.

2. The method of claim 1, wherein the first frequency resource set comprises one of the following: a plurality of uplink carriers and a plurality of first uplink bandwidth parts (BWPs).

3. The method of claim 1, wherein the first frequency resource sets further comprises a plurality of first frequency resource subsets each comprising one of the following: at least one uplink carrier and at least one uplink BWP.

4. The method of claim 1, wherein the second frequency resource set comprises one of the following: a plurality of downlink carriers and a plurality of downlink BWPs.

5. The method of claim 1, wherein the first message comprising a random access preamble is transmitted on a first physical random access channel (PRACH) occasion on the first frequency resource, wherein the first PRACH occasion is determined according to at least one synchronization signal (SS) block selected from a plurality of SS blocks received by the wireless communication device on the second frequency resource.

6. The method of claim 1, wherein the first message can be transmitted by the wireless communication device at a transmission power determined by PREAMBLE_RECEIVED_TARGET_POWER=ra-PreambleInitialReceivedTargetPower+DELTA_PREAMBLE+(PREAMBLE_POWER_RAMPING_COUNTER−1)*powerRampingStep+Ra-offset, wherein the ra-PreambleInitialReceivedTargetPower is an initial transmission power of the first message, the DELTA_PREAMBLE is an offset, the PREAMBLE_POWER_RAMPING_COUNTER is a counter for transmission of the first message, the powerRampingStep is a power-ramping factor, and Ra-offset is a transmission power offset, wherein Ra-offset is non-negative and preconfigured by system information.

7. The method of claim 1, wherein the predetermined time window is increased to prevent failure of a RACH procedure,
    wherein the predetermined time window is one entry of a predetermined time window set, wherein the predetermined time window set is one of the following: {sl 1, sl 2, sl 4, sl 8, sl 10, sl 20, sl 40, sl 80, sl 88} and {sl 1, sl 2, sl 4, sl 8, sl 10, sl sl 20, sl 40, sl 80, sl 96}, and wherein "sl x" represents x number of slots, and x is an integer value.

8. The method of claim 1, wherein the second message comprises a random access radio network temporary identifier (RA-RNTI) determined by
    RA-RNTI=1+s_id+14*t_id+14*X*f_id+14*X*Y*ul_carrier_id+Z*BWP index, wherein s_id is an index of a first orthogonal frequency-division multiplexing (OFDM) symbol of a first physical random access channel (PRACH) occasion, t_id is an index of a first time slot of the first PRACH occasion in the time domain, f_id is an index of a first frequency of the first PRACH occasion in the frequency domain, ul_carrier_id is a carrier index of the first frequency resource, and BWP index is a BWP index of the first frequency resource, wherein 0≤s_id<14, 0≤t_id<X, 0≤f_id<Y, X=80, Y=8, and Z is one of the following: 0, 1, and 14*X*Y.

9. The method of claim 1, wherein the third message are transmitted for a plurality of times on a plurality of second time slots under a predetermined slot aggregation setting, comprising a repetition number and a repetition redundancy version.

10. The method of claim 1, further comprising
    determining an availability of the second and third frequency resources before the transmitting using listen-before-transmitting (LBT);
    decoding the second message received by the wireless communication device on the second frequency resource within the predetermined time window to determine a random access radio network temporary identifier (RA-RNTI), wherein the RA-RNTI comprises a random access preamble identifier, wherein the random access preamble identifier is used to compare an index of the random access preamble in the first message on the first frequency resource; and
    re-performing one of the plurality of RACH procedures when the first message in the one of the plurality of RACH procedures is transmitted for N times, wherein the N is a predefined maximum number of transmission times of the first message.

11. A method performed by a wireless communication device, comprising:
    performing a plurality of random access (RACH) procedures with a wireless communication node on a first frequency resource set and a second frequency resource set, wherein the plurality of RACH procedures each comprises:

transmitting a first message on a first frequency resource to the wireless communication node, wherein the first frequency resource is selected from the first frequency resource set;

receiving a second message on a second frequency resource from the wireless communication node within a predetermined time window, wherein the second frequency resource is selected from the plurality of second frequency resources;

transmitting a third message on the first frequency resource to the wireless communication node, the third message triggering a timer; and receiving a fourth message on a third frequency resource from the wireless communication node, wherein the third frequency resource is selected from the second frequency resource set; and based on a receiving of the fourth message of one of the plurality of RACH procedures from the wireless communication node prior to expiration of the timer, terminating the rest of the plurality of RACH procedures.

12. The method of claim 11, wherein the first frequency resource set comprises one of the following: a plurality of uplink carriers and a plurality of uplink bandwidth parts (BWPs).

13. The method of claim 11, wherein the first frequency resource sets further comprises a plurality of first frequency resource subsets each comprising one of the following: at least one uplink carrier and at least one uplink bandwidth parts (BWP).

14. The method of claim 11, wherein the second frequency resource set comprises one of the following: a plurality of downlink carriers and a plurality of downlink bandwidth parts (BWPs).

15. The method of claim 11, wherein the first message comprising a random access preamble is transmitted on a first physical random access channel (PRACH) occasion on the first frequency resource, wherein the first PRACH occasion is determined according to at least one synchronization signal (SS) block selected from a plurality of SS blocks received from the wireless communication node on the second frequency resource.

16. The method of claim 11, wherein the predetermined time window is increased to prevent failure of a RACH procedure, wherein the predetermined time window is one entry of a predetermined time window set, wherein the predetermined time window set is one of the following: {sl 1, sl 2, sl 4, sl 8, sl 10, sl 20, sl 40, sl 80, sl 88} and {sl 1, sl 2, sl 4, sl 8, sl 10, sl sl 20, sl 40, sl 80, sl 96}, and wherein "sl x" represents x number of slots, and x is an integer value.

17. The method of claim 11, wherein the third message are transmitted for a plurality of times on a plurality of second time slots under a predetermined slot aggregation setting, comprising a repetition number and a repetition redundancy version.

18. A computing device comprising: at least one processor configured to implement the method of claim 1.

19. A computing device comprising: at least one processor configured to implement the method of claim 11.

* * * * *